United States Patent
Kobayashi et al.

(10) Patent No.: US 9,577,560 B2
(45) Date of Patent: *Feb. 21, 2017

(54) SYNCHRONOUS MACHINE CONTROL DEVICE

(71) Applicants: Takahiko Kobayashi, Tokyo (JP); Kiyoharu Anzai, Tokyo (JP); Noriyuki Wada, Tokyo (JP); Daiki Matsuura, Tokyo (JP)

(72) Inventors: Takahiko Kobayashi, Tokyo (JP); Kiyoharu Anzai, Tokyo (JP); Noriyuki Wada, Tokyo (JP); Daiki Matsuura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 14/413,261

(22) PCT Filed: Oct. 12, 2012

(86) PCT No.: PCT/JP2012/076457
§ 371 (c)(1),
(2) Date: Jan. 7, 2015

(87) PCT Pub. No.: WO2014/057575
PCT Pub. Date: Apr. 17, 2014

(65) Prior Publication Data
US 2015/0137720 A1    May 21, 2015

(51) Int. Cl.
*H02P 21/14*    (2016.01)
*H02P 29/00*    (2016.01)
(Continued)

(52) U.S. Cl.
CPC ......... *H02P 21/141* (2013.01); *H02P 29/0055* (2013.01); *H02P 2207/05* (2013.01)

(58) Field of Classification Search
None
See application file for complete search history.

(56) References Cited

U.S. PATENT DOCUMENTS 6,822,416 B1 * 11/2004 Kunz ................... H02H 7/0844
                                                      318/700
8,912,739 B2 * 12/2014 Kobayashi ............ H02P 21/141
                                                    318/400.02
(Continued)

FOREIGN PATENT DOCUMENTS

JP     11-069900 A    3/1999
JP    2006-254521 A   9/2006
(Continued)

OTHER PUBLICATIONS

International Search Report for PCT/JP2012/076457 dated Jan. 8, 2013.

*Primary Examiner* — Eduardo Colon Santana
*Assistant Examiner* — Said Bouziane
(74) *Attorney, Agent, or Firm* — Sughrue Mion, PLLC; Richard C. Turner

(57) ABSTRACT

A synchronous machine control device is provided with a magnet state outputter that estimates a magnetic flux of a permanent magnet forming the magnetic field of a synchronous machine. In a magnet state correction value calculation mode, the magnet state outputter calculates a magnet state correction value. In a magnet state estimation mode, the magnet state outputter obtains, from a magnet state estimation device, a magnetic flux estimation value of the permanent magnet under a given condition of a magnetic flux command and a δ-axis current command and controls a magnet state corrector to correct the magnetic flux estimation value of the permanent magnet obtained by the magnet state estimation device, by use of the magnet state correction value.

6 Claims, 15 Drawing Sheets

(51) Int. Cl.
    *H02P 21/00* (2016.01)
    *H02P 6/16* (2016.01)

(56) References Cited

U.S. PATENT DOCUMENTS

| | | | |
|---|---|---|---|
| 9,054,630 B2 * | 6/2015 | Kobayashi | H02P 29/0066 |
| 2003/0102839 A1 | 6/2003 | Kinpara et al. | |
| 2005/0024009 A1 | 2/2005 | Kinpara et al. | |
| 2006/0119312 A1 | 6/2006 | Okamura et al. | |
| 2008/0191656 A1 * | 8/2008 | Satake | B60L 11/1803 318/722 |
| 2010/0109586 A1 * | 5/2010 | Matsui | B60L 11/14 318/400.04 |
| 2012/0001573 A1 | 1/2012 | Kimpara et al. | |
| 2013/0249448 A1 * | 9/2013 | Kobayashi | H02P 21/141 318/400.02 |
| 2014/0049202 A1 * | 2/2014 | Fukumaru | H02P 21/146 318/400.32 |

FOREIGN PATENT DOCUMENTS

| | | |
|---|---|---|
| JP | 4223880 B2 | 2/2009 |
| JP | 2010-110141 A | 5/2010 |
| JP | 4672236 B2 | 4/2011 |
| WO | 2005/112249 A1 | 11/2005 |
| WO | 2010/109528 A1 | 9/2010 |

\* cited by examiner

SYNCHRONOUS MACHINE CONTROL DEVICE

CROSS REFERENCE TO RELATED APPLICATION

This application is a National Stage of International Application PCT/JP2012/076457 filed Oct. 12, 2012, the contents of all of which is incorporated herein by reference in its entirety.

TECHNICAL FIELD

The present invention relates to a synchronous machine control device provided with an electric-power conversion means that drives a synchronous machine.

BACKGROUND ART

As is well known, in the case where a synchronous machine having a permanent magnet, as a magnet-field magnet, is controlled by a synchronous machine control device having an electric-power conversion means such as an inverter, a temperature rise due to energization of the armature winding of a synchronous machine, an iron loss in the synchronous machine itself, or the like causes a so-called "demagnetization" phenomenon in which the intensity of magnetization of the magnetic-field permanent magnet, i.e., the magnetic flux is reduced; furthermore, when the allowable temperature is exceeded, a so-called "irreversible demagnetization" phenomenon is caused in which even when the temperature falls down to the normal temperature, the magnetic flux does not return to the state at a time before the demagnetization is caused. Accordingly, it is required that when a synchronous machine having a permanent magnet as a magnetic-field magnet is controlled, at least the temperature of the permanent magnet is suppressed at a temperature lower than the allowable temperature at which irreversible demagnetization is caused. However, due to a space problem caused by the structure of the synchronous machine, a case protecting the outside of the synchronous machine, or the like, it is difficult to directly mount a temperature detection device on the permanent magnet; accordingly, there is required a technology for indirectly measuring or estimating, with some sort of method, the temperature of the permanent magnet or the magnetic flux related to the temperature of the permanent magnet.

As an example of synchronous machine control device that solves these problems, there exists a conventional device (for example, refer to Patent Document 1) in which based on information items about the current, the temperature, and the rotation speed obtained from a current sensor that detects the current to be exchanged between the inverter and the armature winding, a temperature sensor that detects the temperature of the armature winding so as to correct the resistance value of the armature winding, and a magnetic pole position sensor that detects the magnetic pole position of the magnetic-field magnet, respectively, the magnetic flux that departs from the magnetic-field permanent magnet and is interlinked with the armature winding is obtained by a magnetic flux observer consisting of a model of the synchronous machine (electric rotating machine) and a proportion integrator. As another example of similar control device, there exists a conventional device (for example, refer to Patent Document 2) that has a means for detecting the value of a phase-difference angle δ between the induction voltage generated by a permanent magnet and the terminal voltage and outputs magnet temperature information, with reference to the phase-difference angle δ at a reference temperature and the detected phase-difference angle δ and based on a magnet temperature table.

As another example of the similar control devices, there exists a conventional device (for example, refer to Patent Document 3) in which in the control utilizing a rotating-two-axis (d-q axes) coordinate transformation, a q-axis voltage operation amount at the time when no demagnetization is caused in an permanent magnet is held as a map and then a demagnetization amount is calculated based on a q-axis voltage operation amount, which is the output of the PI control unit at the time when a synchronous machine is current-controlled through proportional integral (PI) control, the q-axis voltage operation amount held in the map (when no demagnetization is caused in the permanent magnet), and a rotation angular-velocity ω.

Each of Patent Documents 4 and 5 discloses an example of technology in which based on a voltage command for a synchronous machine and an armature current, the rotor position of the synchronous machine is estimated through a calculation.

PRIOR ART REFERENCE

Patent Document

[Patent Document 1] Japanese Patent Application Laid-Open No. 2010-110141
[Patent Document 2] Japanese Patent Application Laid-Open No. H11-69900
[Patent Document 3] Japanese Patent No. 4223880
[Patent Document 4] Japanese Patent No. 4672236
[Patent Document 5] International Publication No. WO2010/109528

DISCLOSURE OF THE INVENTION

Problems to be Solved by the Invention

In the conventional device disclosed in Patent Document 1, when the magnetic flux observer obtains the value of magnetic flux that departs from the magnetic-field permanent magnet and is interlinked with the armature winding, the resistance value of the armature winding, corrected based on the output of a temperature sensor that detects the temperature of the armature winding, is utilized; therefore, the temperature sensor for detecting the temperature of the armature winding is required, whereby there is posed a problem that the number of constituent components in the control device certainly increases. In the conventional device disclosed in Patent Document 2, when a magnet temperature table required for outputting magnet temperature information is obtained through a calculation, the correlation between the phase-difference angle δ and the magnet temperature cannot accurately be calculated when the inductance of the synchronous machine is not accurately comprehended and hence there exists a problem that due to an error in the inductance, the accuracy in estimating the magnet temperature estimation is deteriorated. In the case where the magnet temperature table is obtained through an actual measurement, it is required to create map data by performing the measurement while changing the magnet temperature according to some sort of method; however, it is not easy to build an environment for adjusting the magnet temperature to a desired one; thus, there exists a problem that a great deal of work is required for creating the map data.

In the conventional device disclosed in Patent Document 3, although whether or not demagnetization has occurred can be determined, no method of obtaining the magnet temperature or the absolute value (quantity) of the magnetic flux of the magnet is not disclosed, and in order to determine whether or not demagnetization has occurred, it is required to set the d-q axis current command in a single and the same manner for both pre-demagnetization and post-demagnetization periods; accordingly, when demagnetization occurs, the demagnetization quantity is calculated and corrected after it is determined that demagnetization has occurred, so that the amount of decreased toque corresponding to the demagnetization can be corrected; thus, there exists a problem that the torque produced by the synchronous machine becomes smaller than a desired torque (command value) by the time the occurrence of the demagnetization is determined.

The present invention has been implemented in order to solve the foregoing problems in conventional synchronous machine control devices; the objective thereof is to provide a synchronous machine control device that can estimate with a high accuracy the temperature of a permanent magnet or the magnetic flux value while driving the synchronous machine having the magnetic-field permanent magnet, without any temperature detector being directly mounted on the permanent magnet.

Means for Solving the Problems

A synchronous machine control device according to the present invention includes an electric-power conversion means that outputs a voltage to a synchronous machine having a permanent magnet for forming a magnetic field, based on a voltage command; a current detection means that detects an armature current of the synchronous machine; an armature interlinked magnetic flux estimation device that estimates, based on the voltage command, the magnitude of an armature interlinked magnetic flux of the synchronous machine and a γ axis along which the armature interlinked magnetic flux is produced and that coordinate-transforms the armature current into a current on a γ-δ axis consisting of the γ axis and a δ axis that is perpendicular to the γ axis, based on a rotor position of the synchronous machine and the estimated γ axis; a magnetic flux control device that creates a γ-axis current command for controlling a γ-axis current to be a predetermined value, based on a magnetic flux command and the magnitude of the armature interlinked magnetic flux; a current control device that creates the voltage command, based on a γ-δ axis current command obtained by adding a δ-axis current command to the γ-axis current command and the γ-δ axis current; and a magnet state output means that estimates and outputs a magnetic flux or a temperature of the permanent magnet. The magnet state output means is provided with a magnet state estimation device for estimating a magnetic flux or a temperature of the permanent magnet based on the γ-axis current, the δ-axis current command, and the magnetic flux command, and the magnet state output means has a magnet state correction value calculation mode and a magnet state estimation mode; in the magnet state correction value calculation mode, the magnet state output means gives the magnet state estimation device zero as each of current commands of the respective axes on the γ-δ axis and calculates a magnet state correction value, based on the magnitude of the armature interlinked magnetic flux estimated under the condition of the current commands and a magnetic flux estimation value or a temperature estimation value of the permanent magnet obtained by the magnet state estimation device under the condition that predetermined magnetic flux command and δ-axis current command are given to the magnet state estimation device; in the magnet state estimation mode, the magnet state output means is provided with a magnet state correction means that corrects by the magnet state correction value the magnetic flux estimation value or the temperature estimation value of the permanent magnet obtained by the magnet state estimation device under the condition that the predetermined magnetic flux command and δ-axis current command are given.

Advantage of the Invention

A synchronous machine control device according to the present invention makes it possible to correct an estimation error in the magnetic flux or the temperature of a permanent magnet, caused by individual unevenness of a synchronous machine or an inductance error; therefore, the accuracy in estimating the magnetic flux or the temperature of the permanent magnet can be raised. Moreover, the synchronous machine control device according to the present invention makes it possible to directly control the armature interlinked magnetic flux and the δ-axis current that are directly related to the torque generated by the synchronous machine; therefore, even when the permanent magnet is demagnetized, the torque can be controlled to the desired torque.

The foregoing and other object, features, aspects, and advantages of the present invention will become more apparent from the following detailed description of the present invention when taken in conjunction with the accompanying drawings.

BEST MODE FOR CARRYING OUT THE INVENTION

Figure 1:
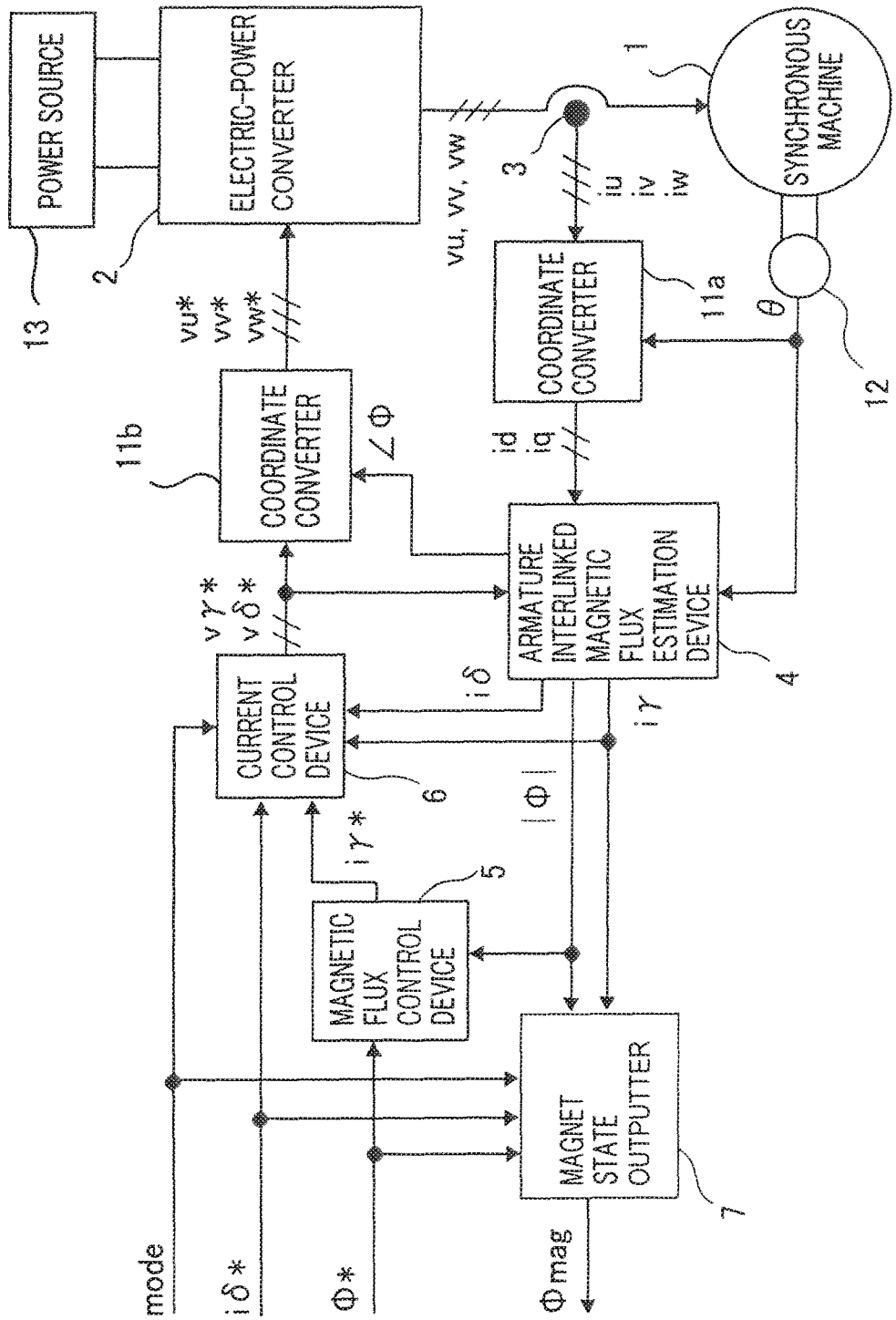
FIG. 1 is a system configuration diagram illustrating a synchronous machine control device according to Embodiment 1 of the present invention, along with a synchronous machine.

Hereinafter, Embodiments of a synchronous machine control device according to the present invention will be explained with reference to the drawings. In each of the drawings, the same reference characters denote the same or similar constituent elements.

Embodiment 1

FIG. 1 is a system configuration diagram illustrating a synchronous machine control device according to Embodiment 1 of the present invention, along with a synchronous machine 1. A synchronous machine 1 according to the present invention has a magnetic-field permanent magnet. Hereinafter, there will be explained the configuration of a synchronous machine control device that drives the synchronous machine 1 according to Embodiment 1 and the functions of the constituent elements thereof. At first, with regard to the configuration, of a synchronous machine control device according to Embodiment 1 of the present invention, that is required for driving a synchronous machine, there will be explained the flow, from the output side of an electric-power conversion means 2 to the input side thereof, in which a voltage command is created.

In FIG. 1, the synchronous machine 1 having a magnetic-field permanent magnet is controlled by a synchronous machine control device according to Embodiment 1 of the present invention. The synchronous machine control device is provided with an electric-power conversion means 2 (e.g., electric power converter) whose input and output are connected with a power source 13 and the armature winding of the synchronous machine 1, respectively, a current detection means 3 (e.g., current detector) that detects the armature current of the synchronous machine 1, an armature inter-linked magnetic flux estimation device 4, a magnetic flux control device 5, a current control device 6, a magnet state output means 7 (e.g., magnet state outputter), coordinate transformers 11a and 11b, and a position detection means 12 (e.g., position detector). The power source 13 is formed of a power supply unit or a battery that outputs a DC voltage. The concept of the power source 13 includes an apparatus that obtains a DC voltage from a single-phase or a three-phase AC power source by use of a well-known converter.

The electric-power conversion means 2 includes an inverter to be controlled through a well-known PWM (Pulse Width Modulation) method, converts DC electric power supplied from the power source 13 connected with the input thereof into multi-phase AC electric power, and then supplies the converted multi-phase AC electric power to the armature winding of the synchronous machine 1. Describing more in detail, the electric-power conversion means 2 generates a multi-phase AC voltage, based on a voltage command obtained from the current control device 6, described later, or to be more exact, based on a multi-phase AC voltage command obtained by applying coordinate transformation to a voltage command outputted from the current control device 6, and applies the multi-phase AC voltage to the armature winding of the synchronous machine 1 so as to drive the synchronous machine 1. As a result, an output current is produced in the armature winding of the synchronous machine 1. Hereinafter, the output current produced in the armature winding will be expressed as an "armature current".

The armature current, which is the output current of the synchronous machine 1, is detected by the current detection means 3 formed of a current sensor or the like. In the case where the synchronous machine 1 is a three-phase synchronous electric rotating machine, the current detection means 3 may be configured in such a way that all of the armature currents of three phases, i.e., iu, iv, and iw of the synchronous machine 1 are detected; alternatively, the current detection means 3 may be configured in such a way that the armature currents of two phases are detected so that the armature current of one phase, for example, the armature current of w-phase iw is obtained through the relationship [iw=−iu−iv] by use of the detected other armature currents of two phases iu and iv. The current detection means 3 may be formed by use of a well-known technology in which the armature current is detected from a DC link current that flows from the power source 13 to the electric-power conversion means 2, instead of being formed of a current sensor or the like that directly detects the armature current of each phase of the synchronous machine 1.

The position detection means 12 is formed of a well-known resolver, encoder, or the like, and detects the position θ of the armature of the synchronous machine 1. Here, the position θ of the armature of the synchronous machine 1 denotes the N-pole-direction angle, of a permanent magnet that forms the magnetic field, with respect to an axis that is set by regarding the armature winding of u-phase as a reference; in general, the d axis of a rotating biaxial coordinate system (expressed as "d-q axis, hereinafter") that rotates at the rotation speed (electric angular frequency ω) of the synchronous machine 1 is set along the N-pole direction of the foregoing permanent magnet, and the q axis thereof is set along a perpendicular direction that is advanced by 90° from the d axis. This applies to the following explanation.

The coordinate transformer 11a transforms the armature currents iu, iv, and iw of the synchronous machine 1 into currents id and iq on the d-q axis through a calculation according to the equation (1) below, based on the rotor position θ.

$$\begin{pmatrix} id \\ iq \end{pmatrix} = \begin{pmatrix} \cos\theta & \sin\theta \\ -\sin\theta & \cos\theta \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} iu \\ iv \\ iw \end{pmatrix} \quad (1)$$

At first, the armature interlinked magnetic flux estimation device 4 estimates the magnitude |Φ| of an armature interlinked magnetic flux Φ and the γ axis along which the armature interlinked magnetic flux is generated; specifically, the armature interlinked magnetic flux estimation device 4 estimates the angle ∠Φ0 between the estimated d axis and the direction of the armature-interlinked magnetic flux (vector) Φ; then, based on the result of the foregoing estimation, the armature interlinked magnetic flux estimation device 4 converts the d-q-axis currents id and iq into the γ-δ-axis currents iγ and iδ and obtains the angle ∠Φ (hereinafter, describes as the phase of an armature interlinked magnetic flux) between an axis taken with respect to the u-phase armature winding and the estimated armature interlinked magnetic flux Φ. The armature-interlinked magnetic flux Φ denotes the combined magnetic flux of magnetic flux (referred to as permanent-magnet magnetic flux, hereinafter) Φm produced by the foregoing permanent magnet and magnetic flux (armature reaction magnetic flux) Φa produced by the foregoing armature current; in Embodiment 1 of the present invention, the direction that is perpendicular to (90° advanced from) the foregoing γ axis will be referred to as δ axis.

Figure 2:
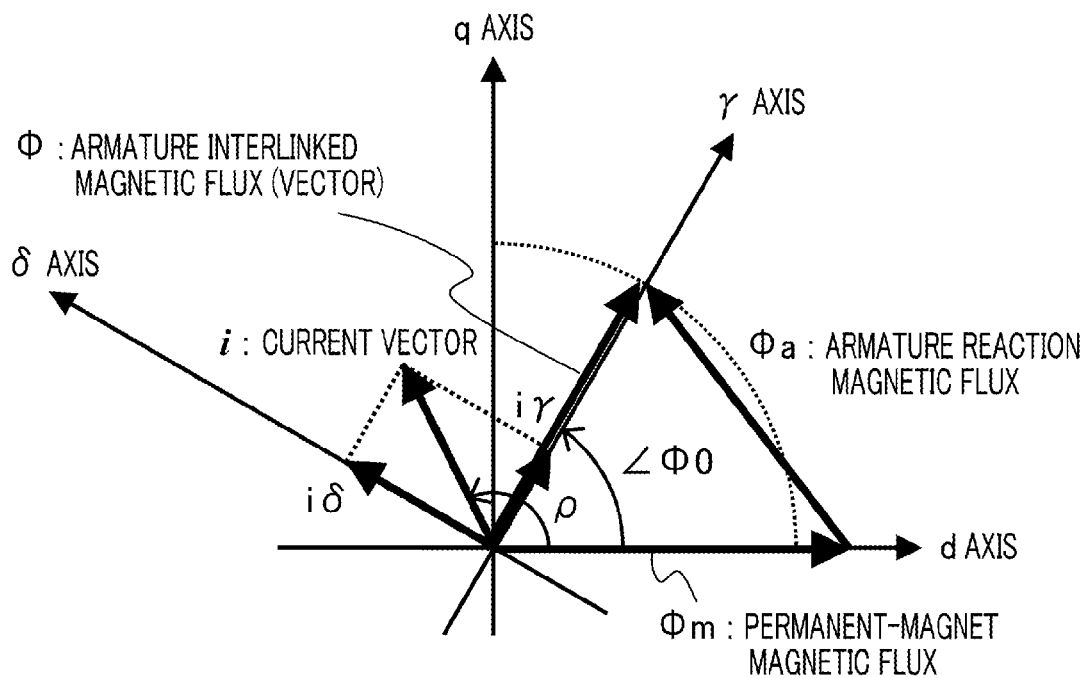
FIG. 2 is a vector chart of a synchronous machine having a magnetic-field permanent magnet.

FIG. 2 is a vector chart of the synchronous machine 1 having a magnetic-field permanent magnet; the relationship between the γ-δ axis and the angle ∠Φ0 between the d axis and the direction of the armature-interlinked magnetic flux (vector) Φ and the like are represented. Hereinafter, a suitable method for estimating the magnitude |Φ| and the angle ∠Φ0 of the armature interlinked magnetic flux Φ will be explained. In the case where the foregoing |Φ| and ∠Φ0 are estimated, at first, based on a set of equations (2) below, which are the relational equations among voltages vd and vq on the d-q axis and the d-axis component Φd and the q-axis component Φq of the armature interlinked magnetic flux Φ, Φd and Φq are obtained; then, from the obtained Φd and Φq, |Φ| is calculated based on the equation (3) below, and the angle ∠Φ0 is calculated based on the equation (4); then, from the angle ∠Φ0 and the rotor position θ of the synchronous machine 1 detected by the position detection means 12, the angle ∠Φ is calculated based on the equation (5).

$$\begin{cases} \Phi d = \frac{1}{\omega}\{vq - (R + Lq \cdot s) \cdot iq\} \cong \frac{1}{\omega}\{vq^* - R \cdot iq\} \\ \Phi q = \frac{1}{\omega}\{vd - (R + Ld \cdot s) \cdot id\} \cong \frac{1}{\omega}\{vq^* - R \cdot iq\} \end{cases} \quad (2)$$

$$|\Phi| = \sqrt{\Phi d^2 + \Phi q^2} \quad (3)$$

$$\angle \Phi 0 = \tan^{-1}\left(\frac{\Phi q}{\Phi d}\right) \quad (4)$$

$$\angle \Phi = \angle \Phi 0 + \theta \quad (5)$$

where Ld is the d-axis direction inductance (expressed as d-axis inductance, hereinafter), Lq is the q-axis direction inductance (expressed as q-axis inductance, hereinafter), R is the resistance (consisting mainly of the resistance of the armature winding of the synchronous machine 1; however, in the case where the effect of the resistance of the wiring lead between the synchronous machine 1 and the electric-power conversion means 2 is considerably large, the resistance of the wiring lead is also taken into consideration), and s is a Laplace operator. The reciprocal 1/s of the Laplace operator s denotes one-time time integration. However, in the configuration illustrated in FIG. 1 according to Embodiment 1 of the present invention, the actual values of the voltages vd and vq on the d-q axis are unknown; therefore, instead of utilizing the voltages vd and vq on the d-q axis, the calculation according to the equation (2) is implemented by use of voltage commands vd* and vq* on the d-q axis to be obtained by applying d-q-axis coordinate transformation to voltage commands vγ* and vδ on the γ-δ axis based on the equation (6) below.

$$\begin{pmatrix} vd^* \\ vq^* \end{pmatrix} = \begin{pmatrix} \cos(\angle\Phi 0) & -\sin(\angle\Phi 0) \\ \sin(\angle\Phi 0) & \cos(\angle\Phi 0) \end{pmatrix} \begin{pmatrix} v\gamma^* \\ v\delta^* \end{pmatrix} \quad (6)$$

In this situation, the angle ∠Φ0 to be obtained in the equation (4) is required. Accordingly, in the case where in an actual device, these processing items are implemented by use of a microcomputer and in a predetermined calculation cycle, for example, the result of an immediately previous (advanced by one calculation cycle) calculation for the angle ∠Φ0 is utilized; alternatively, measures may be taken, for example, in such a way that coordinate transformation according to the equation (6) is implemented by use of the value to be obtained by applying an appropriate filter to the value of the calculated angle ∠Φ0. At a time when the drive of the synchronous machine 1 is started, the voltage commands Vd* and Vq* on the d-q axis are "0" and hence Φd and Φq are "0"; therefore, as the initial value of the d-axis component Φd at a time when the drive of the synchronous machine 1 is started may be set to a predetermined permanent-magnet magnetic flux Φm such as a reference value.

Furthermore, because in the equation (2), the rotation speed ω is utilized for the calculation, a differential operation is implemented by use of the rotor position θ detected by the position detection means 12 so as to obtain the rotation speed ω. In FIG. (2), it may be allowed that assuming that the current changes gradually, the term including the Laplace operator s is neglected.

As far as the resistance R is concerned, because the resistance value changes depending on the temperature of the synchronous machine 1, it may be allowed to correct the value of the resistance R by detecting the temperature of the synchronous machine 1; furthermore, in the case where the terms related to the resistance R are smaller than the other terms, it may be allowed that the terms including the resistance R are neglected and information on the armature current of the synchronous machine 1 is not utilized in the calculation of the angle ∠Φ0 so that the calculation is simplified.

In the configuration illustrated in FIG. 1 according to Embodiment 1 of the present invention, the armature interlinked magnetic flux estimation device 4 contains the coordinate transformation processing in which according to the equation (7) below, the currents id and iq on the d-q axis are transformed into the currents iγ and iδ on the γ-δ axis based on the angle ∠Φ; however, it is not necessarily required that the armature interlinked magnetic flux estimation device 4 contains the coordinate transformation processing.

$$\begin{pmatrix} i\gamma \\ i\delta \end{pmatrix} = \begin{pmatrix} \cos(\angle\Phi 0) & \sin(\angle\Phi 0) \\ -\sin(\angle\Phi 0) & \cos(\angle\Phi 0) \end{pmatrix} \begin{pmatrix} id \\ iq \end{pmatrix} \qquad (7)$$

The γ-axis current Iγ and the δ-axis current Iδ obtained in the equation (7) correspond to the magnetization current for operating the total armature-interlinked magnetic flux Φ of the synchronous machine 1 and to the torque current that contributes to production of the torque of the synchronous machine 1, respectively.

Heretofore, the explanation for the armature interlinked magnetic flux estimation device 4 according to Embodiment 1 of the present invention has been made.

The magnetic flux control device 5 creates a γ-axis current command iγ* so that the magnetic-flux difference ΔΦ between the magnetic flux command Φ* and the magnitude |Φ| of the armature interlinked magnetic flux estimated by the armature interlinked magnetic flux estimation device 4 becomes "0". Because the γ-axis current iγ is a magnetization current, which is the magnetization component for the synchronous machine 1, the armature interlinked magnetic flux can be operated by the γ-axis current. Specifically, the increase/decrease amount of the magnetization current and the increase/decrease amount of the armature interlinked magnetic flux are in proportion to each other with the γ-axis direction inductance Lγ as the proportionality coefficient; therefore, as the controller for adjusting the magnetic-flux difference ΔΦ to be zero, for example, an integrator is suitable. For that reason, the γ-axis current command iγ* is created by use of an integration control calculation represented by the equation (8) below.

$$i\gamma^* = \frac{Kf}{s} \cdot \Delta\Phi = \frac{Kf}{s}(\Phi^* - |\Phi|) \qquad (8)$$

where Kf is an integration gain.

The foregoing configuration makes it possible to control the armature interlinked magnetic flux Φ to be a desired magnetic flux command Φ*.

The current control device 6 outputs the voltage commands vγ* and vδ* on the d-q axis so as to make the currents iγ and iδ on the γ-δ axis coincide with the current command iγ* and iδ*. For example, so-called current feedback control is performed in such a way that based on the respective differences between the current commands iγ* and iδ* on the γ-δ axis and the currents iγ and iδ on the γ-δ axis, a well-known proportional-integral control (PI control) is performed so as to create the voltage commands vγ* and vδ* on the γ-δ axis. However, because the current control device 6 is also involved in the operation in the magnet state output means 7, the specific configuration of the current control device 6 will be described later.

The voltage commands vγ* and vδ on the γ-δ axis outputted from the current control device 6 are converted by the coordinate transformer 11b into the voltage commands vu*, vv*, and vw*, through the equation (9) below and based on the phase ∠Φ, of the armature interlinked magnetic flux Φ, that has been estimated by the armature interlinked magnetic flux estimation device 4; then, the voltage commands vu*, vv*, and vw* are outputted to the electric-power conversion means 2. In this regard, however, it may be allowed that in the equation (9), considering the control calculation delay time (waste time) until the control calculation based on the armature currents iu, iv, and iw detected by the current detection means 3 is reflected on the voltages vu, vv, and vw outputted from the electric-power conversion means 2, the coordinate transformation is performed with a phase obtained by correcting the phase ∠Φ by a phase correction amount Δθd based on the control calculation delay time. As is the case with Embodiment 1, the electric-power conversion means 2 applies the voltages vu, vv, vw to the synchronous machine 1 based on the voltage commands vu*, vv* and vw*, through a well-known PWM control method or the like.

$$\begin{pmatrix} vu^* \\ vv^* \\ vw^* \end{pmatrix} = \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos(\angle\Phi) & -\sin(\angle\Phi) \\ \sin(\angle\Phi) & \cos(\angle\Phi) \end{pmatrix} \begin{pmatrix} V\gamma^* \\ V\delta^* \end{pmatrix} \qquad (9)$$

$$\cong \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos(\angle\Phi + \Delta\theta d) & -\sin(\angle\Phi + \Delta\theta d) \\ \sin(\angle\Phi + \Delta\theta d) & \cos(\angle\Phi + \Delta\theta d) \end{pmatrix} \begin{pmatrix} V\gamma^* \\ V\delta^* \end{pmatrix}$$

Figure 3:
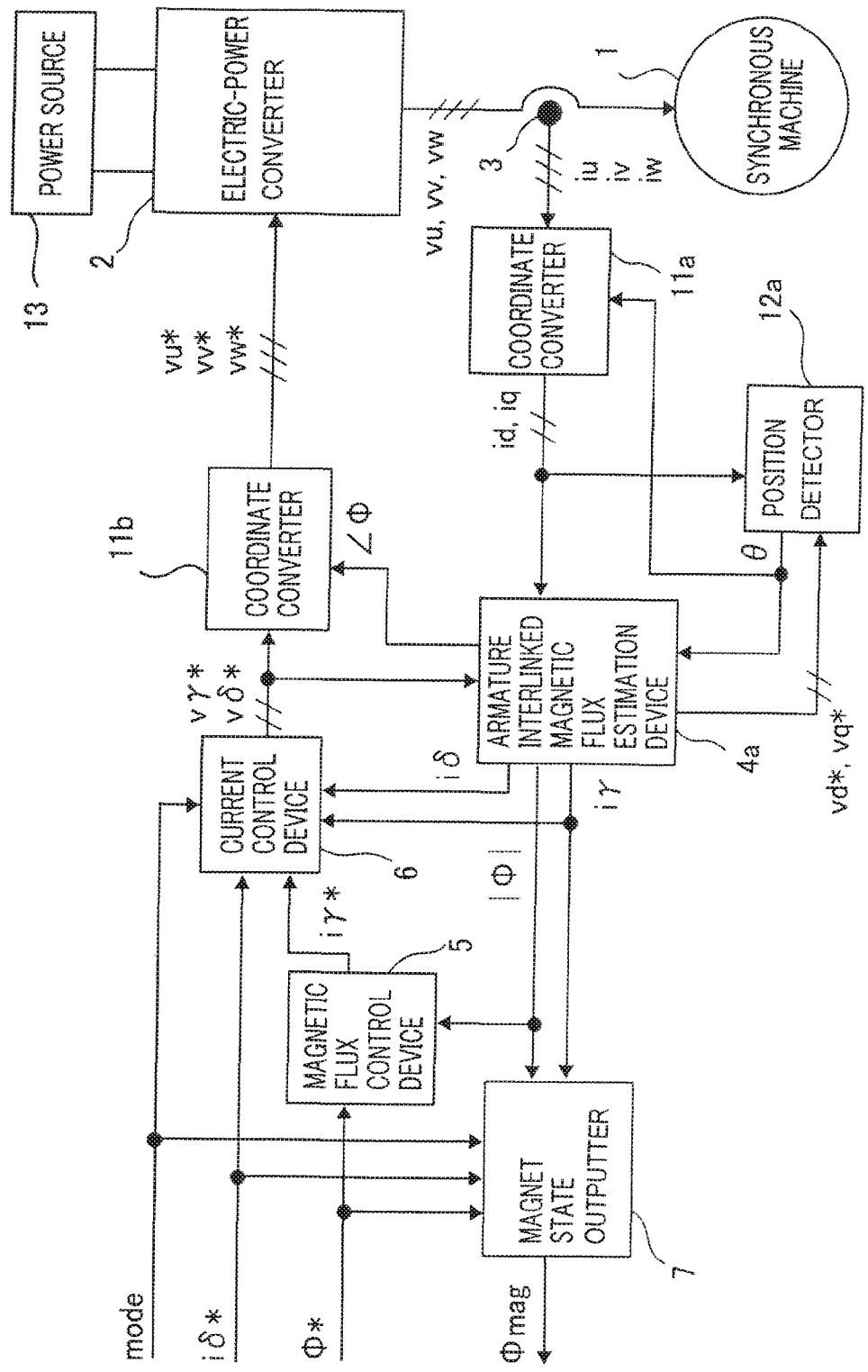
FIG. 3 is a system configuration diagram illustrating a variant example of synchronous machine control device according to Embodiment 1 of the present invention, along with a synchronous machine.

FIG. 3 is a system configuration diagram illustrating a variant example of synchronous machine control device according to Embodiment 1 of the present invention, along with a synchronous machine. The foregoing position detection means 12 in FIG. 1 is utilized in the case where the position θ of the armature of the synchronous machine 1 is detected by use of a well-known resolver or encoder; however, a synchronous machine control device illustrated in FIG. 3 is provided with a position detection means 12a that utilizes a suitable well-known observer or the like and estimates the rotor position θ through a calculation, based on a voltage command, an armature current, and the like. The configuration of the position detection means 12a can be realized by the configuration described in Patent Document 4 or 5; therefore, the explanation therefor will be omitted here. The difference between FIGS. 1 and 3 lies only in the matters related to the position detection means 12 (12a) and in the fact that the armature interlinked magnetic flux estimation device 4 is changed to an armature interlinked magnetic flux estimation device 4a that is configured in such a way as to output, to the outside, the voltage commands vd* and vq* on the d-q axis calculated therein; the other configurations are the same.

What has been described heretofore is the configuration, of the synchronous machine control device according to Embodiment 1 of the present invention, that is required for driving the synchronous machine 1. Because the torque of the synchronous machine 1 is proportional to the product of armature interlinked magnetic flux Φ and the δ-axis current iδ, the armature interlinked magnetic flux Φ and the δ-axis current iδ can directly be controlled in this configuration; therefore, by appropriately setting both the magnetic flux command Φ* and the δ-axis current command iδ*, the torque can desirably be controlled, regardless of whether or not the permanent magnet is demagnetized.

Figure 4:
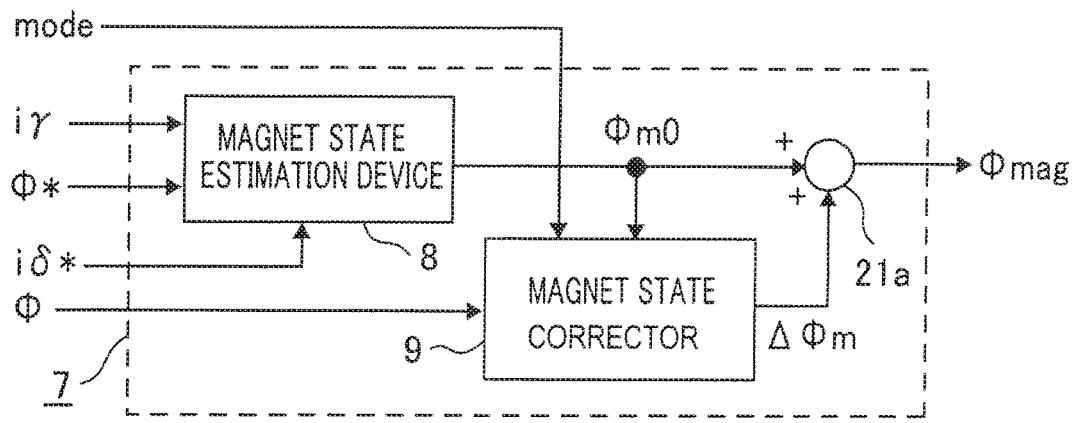
FIG. 4 is a block diagram illustrating an example of configuration of a magnet state output means in a synchronous machine control device according to Embodiment 1 of the present invention.

Next, there will be explained the magnet state output means 7, which is the configuration, required for estimating the temperature or the magnetic flux of the magnetic-field permanent magnet of the synchronous machine 1, that is a feature of the synchronous machine control device according to Embodiment 1 of the present invention; in addition, the foregoing current control device 6 will also be supplementarily explained. FIG. 4 is a diagram illustrating an example of the configuration of the magnet state output means 7 in FIG. 1 or 3. In FIG. 4, the magnet condition estimation means 7 is configured with the magnet state estimation device 8 and the magnet state correction means 9.

The magnet state estimation device 8 preliminarily stores a map or an equation indicating the relationship between the γ-axis current iγ and the permanent-magnet magnetic flux Φm, which is caused by a temperature change at a time when a predetermined magnetic flux command Φ* and the δ-axis current command iδ* are given; when the γ-axis iγ is inputted thereto, the magnet state estimation device 8 refers to the map or the equation and outputs a permanent-magnet magnetic flux estimation value Φm0. The foregoing map or equation is preliminarily obtained by use of characteristic data on the synchronous machine 1, when the characteristics (such as an inductance change and a magnetic demagnetization characteristic) of the synchronous machine 1 are known through an analysis or the like; when not known, it is only necessary to obtain the characteristic data through an actual measurement. Instead of the γ-axis current iγ to be inputted to the magnet state estimation device 8, the current command iγ* outputted from the magnetic flux control device 5 may be utilized.

Figure 5:
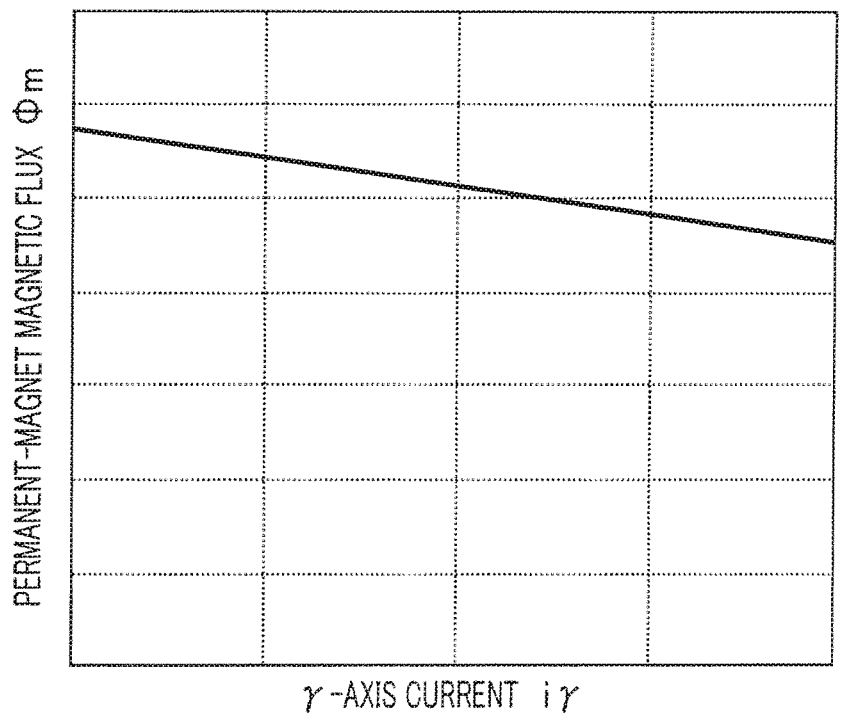
FIG. 5 is a conceptual diagram representing the relationship between the γ-axis current iγ and the permanent-magnet magnetic flux Φm under the condition of a predetermined magnetic flux command Φ* and a predetermined δ-axis current command iδ* in Embodiment 1 of the present invention.

FIG. 5 is a conceptual diagram representing an example of the relationship between the γ-axis current iγ and the permanent-magnet magnetic flux Φm under the condition of a predetermined magnetic flux command Φ* and a predetermined δ-axis current command iδ*. FIG. 5, in which the abscissa denotes the γ-axis current iγ and the ordinate denotes the permanent-magnet magnetic flux Φm, represents the correlation between the γ-axis current iγ and the permanent-magnet magnetic flux Φm. The characteristic of FIG. 5 with the predetermined magnetic flux command Φ* and the predetermined δ-axis current command iδ* is preliminarily stored as a map (equation); then, the same control commands (Φ* and iδ*) are given so as to drive the synchronous machine 1, so that it is made possible that the permanent-magnet magnetic flux Φm is estimated from the γ-axis current iγ and then the estimated value Φm0 is outputted.

Figure 6:
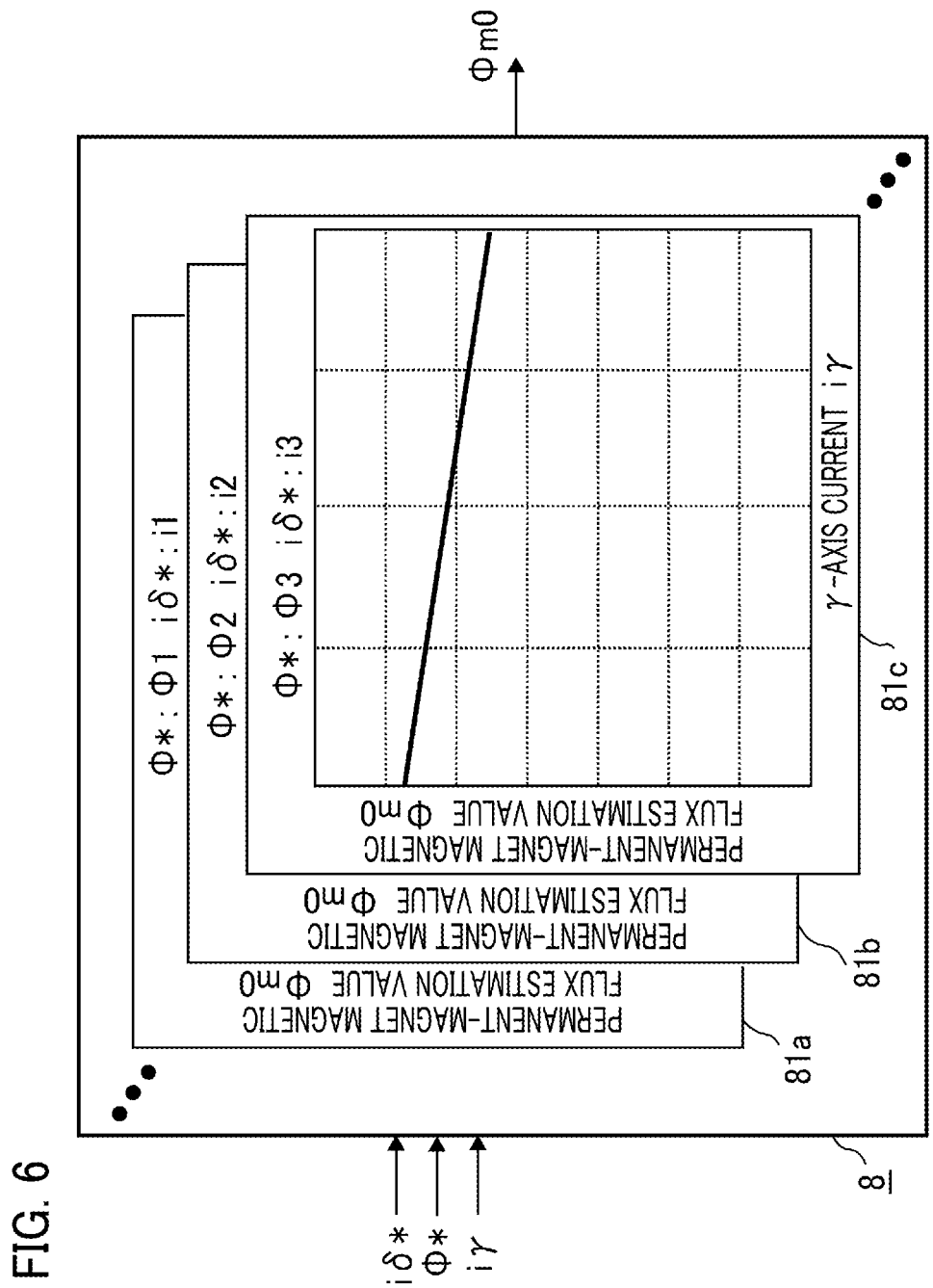
FIG. 6 is a block diagram representing an example of configuration of a magnet state estimation device in a synchronous machine control device according to Embodiment 1 of the present invention.

In addition, it may be allowed that as represented in FIG. 6, the magnet state estimation device 8 is provided with a magnetic condition reference means 81 (81a through 83c, in the example represented in FIG. 6) including maps or equations representing respective correlations between the γ-axis current iγ and the permanent-magnet magnetic flux (estimation value Φm0) for two or more control commands, i.e., control commands configured with pairs of the magnetic flux command Φ* and the δ-axis current command iδ*. When as represented in FIG. 6, the permanent-magnet magnetic flux estimation values Φm0 is outputted, based on the γ-axis current iγ, for each of the two or more control commands configured with the pairs of the magnetic flux command Φ* and the δ-axis current command iδ*, it is made possible that when the magnetic flux of the temperature of the permanent magnet is estimated, the degree of flexibility in giving the pair of the magnetic flux command Φ* and the δ-axis current command iδ* is raised, i.e., the degree of flexibility of the output torque is raised in performing estimation.

When at a time when the synchronous machine 1 is being driven, there exist control commands (Φ*, Iδ*) that coincide with a control command condition in the two or more preliminarily prepared magnetic condition reference means, the permanent-magnet magnetic flux estimation value Φma0 can be outputted by referring to the γ-axis current iγ of the map (or the equation) in the magnetic condition reference means 81 whose control command conditions coincide with the control commands. In the case where no control commands at a time when the synchronous machine 1 is being driven coincide with the control command conditions in each of the preliminarily prepared magnetic condition reference means 81, it is only necessary to hold the magnetic flux estimation value in the immediately previous estimation operation, instead of performing the permanent-magnet magnetic flux estimation operation, and to output the foregoing magnetic flux estimation value, as the permanent-magnet magnetic flux estimation value Φm0. Alternatively, when there exist control command conditions, in the preliminarily prepared magnetic condition reference means 81, that coincide with the torque (i.e., the product of the magnetic flux command Φ* and the δ-axis current command iδ*), it is only necessary to implement processing in which the control commands are changed to the conditions of the magnetic flux command Φ* and the δ-axis current command iδ* in the foregoing magnetic condition reference means 81 and then the permanent-magnet magnetic flux estimation operation is performed.

Figure 7:
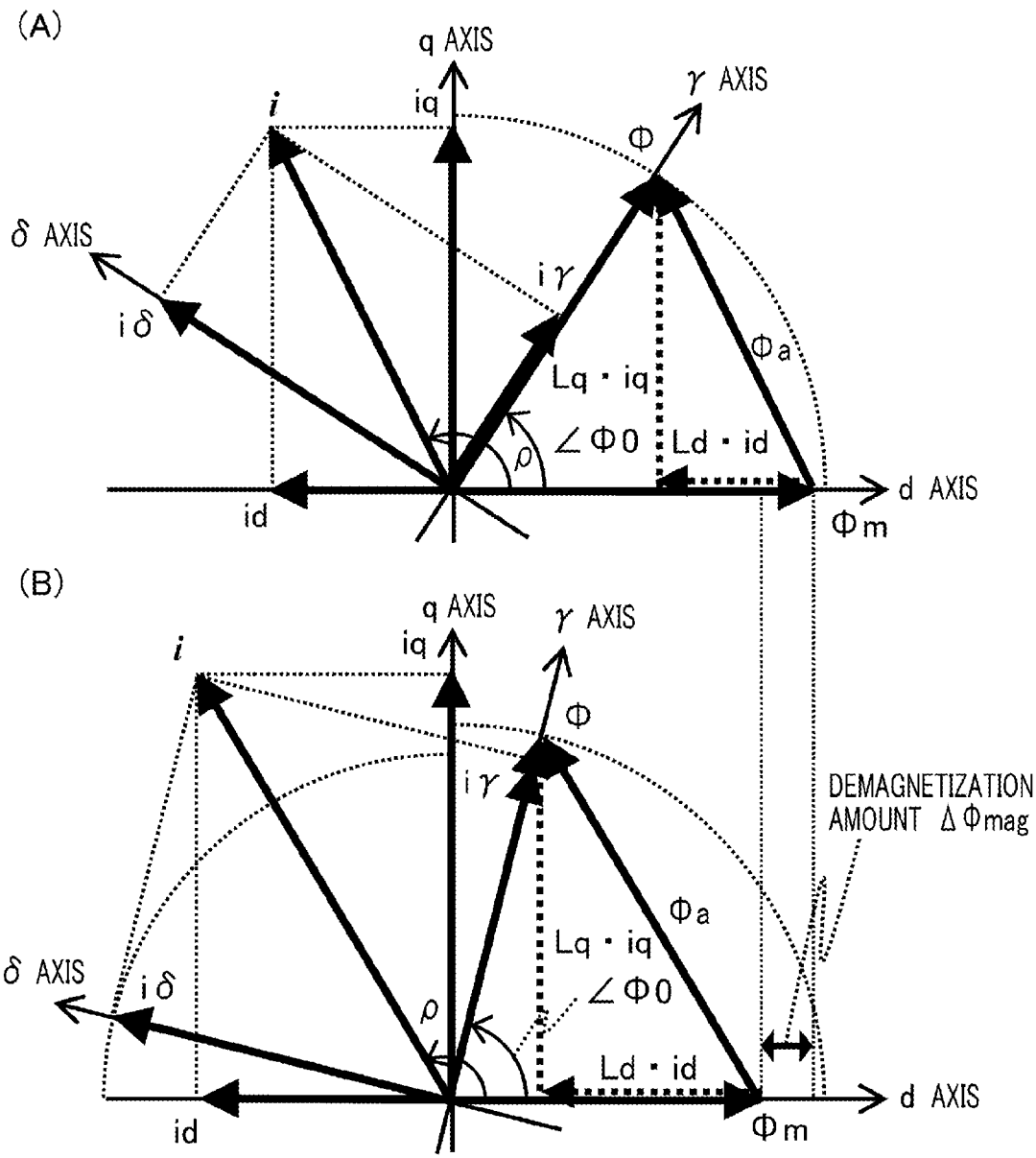
FIG. 7 is a set of explanatory charts representing the difference between a vector chart in the reference condition and a vector chart at a time when demagnetization is caused under the condition that the magnetic flux command Φ* and the δ-axis current command iδ* are constant, in a vector chart of a synchronous machine having a magnetic-field permanent magnet.

Here, by use of a vector chart of the synchronous machine, there will be explained the principle in which when as predetermined control commands, the magnetic flux command Φ* and the δ-axis current command iδ* are given, the permanent-magnet magnetic flux Φm can be estimated based on the γ-axis current iγ. FIG. 7 is a set of explanatory charts representing the difference between a vector chart in the reference condition and a vector chart at a time when demagnetization is caused under the condition that the magnetic flux command Φ* and the δ-axis current command iδ* are constant, in a vector chart of a synchronous machine having a magnetic-field permanent magnet. In FIG. 7, FIG. 7(A) is a vector chart at a time when the permanent magnet is in the reference condition, i.e., no demagnetization is caused in the permanent magnet; FIG. 7(B) is a vector chart at a time when the magnetic flux decreases by an amount corresponding to demagnetization of the permanent magnet, caused due to a temperature rise in the synchronous machine 1, i.e., by ΔΦmag, when the permanent magnet is in a steady state where the magnitude |Φ| of armature interlinked magnetic flux and the δ-axis current iδ are constant under an assumption that the magnetic flux command Φ* and the δ-axis current command iδ*, which are predetermined control commands, are constant, i.e., desirably controlled.

The foregoing demagnetization of the permanent magnet changes the direction of the armature interlinked magnetic flux Φ, i.e., the direction of the γ-axis; therefore, there occurs a change between the pre-demagnetization γ-axis current iγ and the post-demagnetization γ-axis current iγ, even when the magnetic flux command Φ* and the δ-axis current command iδ* are kept constant. Suppression of a change in the γ-axis current iγ makes it possible to prevent the permanent-magnet magnetic flux Φm from changing. In principle, even the configuration consisting of only the magnet state estimation device 8 makes it possible to estimate the permanent-magnet magnetic flux Φm; however, the amount of a change in the magnetic flux of the magnet, caused by the permanent-magnet demagnetization due to a temperature rise in the synchronous machine 1, is not large; therefore, it is required that the foregoing change in the armature reaction magnetic flux Φa due to a change in the armature current is accurately comprehended and then the relationship between the γ-axis current iγ and the permanent-magnet magnetic flux Φm in predetermined conditions of the control commands (Φ*, iδ*) is obtained.

The magnitude of the armature reaction magnetic flux Φa depends on the armature current and d-axis inductance Ld or the q-axis inductance Lq. For example, when based on characteristic data on the synchronous machine 1 preliminarily obtained from an analysis, the relationship between the γ-axis current iγ and the permanent-magnet magnetic flux Φm, which is caused by a temperature change at a time when predetermined control commands (Φ* and iδ*) are given, is obtained, the magnitude of the armature reaction magnetic flux Φa is erroneously estimated when there exists an error in any one of the inductance values; therefore, no accurate relationship between the γ-axis current iγ and the permanent-magnet magnetic flux Φm may be obtained and hence the permanent-magnet magnetic flux Φm may be estimated based on an erroneous map or equation.

In addition, in the case where a plurality of synchronous machines having the same rating and specification are procured, it is ideal that the resistance R, the d-axis inductance Ld or the q-axis inductance Lq, and the value of the permanent-magnet magnetic flux at a reference temperature are the same; however, in practice, because there exists individual unevenness, the relationship between the γ-axis current iγ and the permanent-magnet magnetic flux Φm may change depending on the individual unevenness. For example, even when one of the plurality of synchronous machines having the same rating and specification is extracted and the characteristic data is collected through actual measurement so as to obtain the foregoing map or equation, the relationship between the γ-axis current iγ and the permanent-magnet magnetic flux Φm for the same control commands does not necessarily coincide with the foregoing map (equation) in another extracted synchronous machine, due to the individual unevenness.

Accordingly, it is desirable to correct an estimation error, in the permanent-magnet magnetic flux Φm, that is caused by the individual unevenness or the inductance error of the synchronous machine 1; thus, a synchronous machine control device according to Embodiment 1 of the present invention is configured in such a way that the magnet state correction means 9 applies correction corresponding to the estimation error to the permanent-magnet magnetic flux estimation value Φm0 estimated by the magnet state estimation device 8 at a time when predetermined control commands (Φ* and iδ*) are given.

In the synchronous machine control device according to Embodiment 1 of the present invention, two operation modes are specified; that is to say, "a magnet state correction value calculation mode" in which there is calculated a correction value ΔΦm for correcting an estimation error, in the permanent-magnet magnetic flux Φm, that is caused by the individual unevenness or the inductance error of the synchronous machine 1, and "a magnet state estimation mode" in which after predetermined control commands (Φ* and iδ*) are given and the magnet state estimation device 8 estimates the permanent-magnet magnetic flux Φm, the magnet state correction means 9 applies correction corresponding to the foregoing correction value ΔΦm to the estimation value Φm0 and then the corrected permanent-magnet magnetic flux estimation value Φmag is outputted.

In order to specify the two modes, the foregoing two modes are set by variable modes in the synchronous machine control device according to Embodiment 1 of the present invention. It goes without saying that it may be allowed that there exists a mode that is different from the foregoing two modes and in which neither is the correction value ΔΦm calculated, nor is the permanent-magnet magnetic flux estimation value Φmag outputted.

At first, there will be explained the "magnet state correction value calculation mode" in which the correction value ΔΦm for correcting an estimation error in the permanent-magnet magnetic flux Φm is calculated.

As the first step of the "magnet state correction value calculation mode", a non-energization state is created in which no current flows in the synchronous machine 1 and then, in this situation, the magnitude of the armature interlinked magnetic flux Φ is obtained by the armature interlinked magnetic flux estimation device 4. When the synchronous machine is not energized, the armature-interlinked magnetic flux is formed only with the permanent-magnet magnetic flux Φm; therefore, the magnitude |Φ| of the armature-interlinked magnetic flux and the magnitude of the permanent-magnet magnetic flux Φm coincide with each other.

Therefore, the current commands iγ* and iδ* on the γ-δ axis, which are the inputs of the current control device 6, are set in such a way that the armature current of the synchronous machine 1 becomes zero (i.e., iγ*=iδ*=0), so that the output Φ0 of the armature interlinked magnetic flux estimation device 4 becomes equal to the permanent-magnet magnetic flux Φm.

Because the synchronous machine is not energized, the output Φ0 of the armature interlinked magnetic flux estimation device 4 is not liable to undergo the effect of the inductance and the effect of the voltage output accuracy, of a voltage conversion means 2, that depends on a well-known dead time; thus, the output Φ0 of the armature interlinked magnetic flux estimation device 4 approximately coincides with the permanent-magnet magnetic flux Φm. However, in order to create the non-energization state for the synchronous machine 1, the speed thereof is required to be within a range in which the (unloaded) induction voltage generated in the armature of the synchronous machine 1 is the same as or lower than the outputtable voltage of the electric-power conversion means 2. In a speed range in which the (unloaded) induction voltage generated in the armature of the synchronous machine 1 exceeds the outputtable voltage of the electric-power conversion means 2, it is required to make a weakening magnetic flux current for suppressing at least the rise of the induction voltage flow in the armature winding; therefore, the non-energization state cannot be created.

Therefore, in order to make it possible to set the "magnet state correction value calculation mode", the speed thereof is within a range in which the (unloaded) induction voltage generated in the armature of the synchronous machine 1 is the same as or lower than the outputtable voltage of the electric-power conversion means 2.

Figure 8:
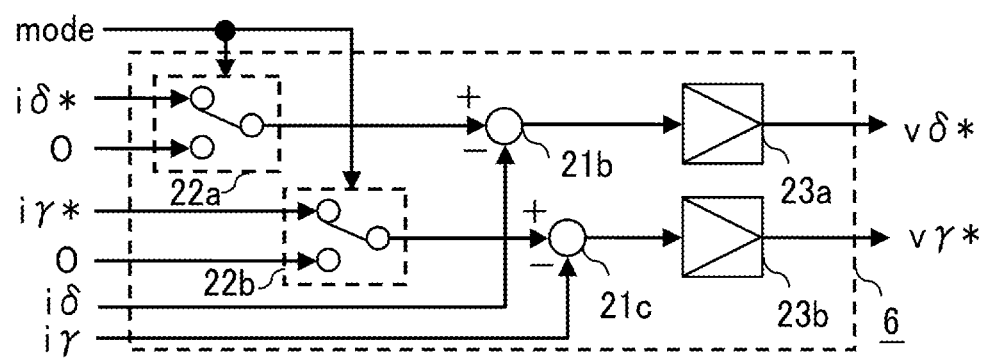
FIG. 8 is a block diagram illustrating an example of configuration of a current control device in a synchronous machine control device according to Embodiment 1 of the present invention.

Here, an example of method for setting the synchronous machine to the non-energization state will be explained based on the configuration of the current control device 6. FIG. 8 is a diagram illustrating an example of the configuration of the current control device 6 in FIG. 1 or 3. In the case where in the current control device 6, a well-known proportional-integral control (PI control) is implemented, for example, when the variable mode in FIG. 8 is "0", the first step of the "magnet state correction value calculation mode" is set, and when the variable mode is "1", the after-mentioned second step of the "magnet state correction value calculation mode" or the "magnet state estimation mode" is set; when as the variable mode, "0" is inputted, "0" is selected as each of the current commands $i\gamma^*$ and $i\delta^*$ on the γ-δ axis, and when as the variable mode, "1" is inputted, (the values of) $i\gamma^*$ and $i\delta^*$ are selected, as is the case of the normal operation. In FIG. 8, the selection operations for $i\delta^*$ and $i\gamma^*$ are shown by use of switches 22a and 22b, respectively; however, other means that have the same functions may be utilized. Based on the difference between the (values of) current commands $i\gamma^*$ and $i\delta^*$ on the γ-δ axis and the currents iγ and iδ on the γ-δ axis, the proportional-integral control (PI control) is performed by the PI controllers 23a and 23b, so that the voltage commands $v\gamma^*$ and $v\delta^*$ on the γ-δ axis are created and when the mode is "0", i.e., in the first step of the "magnet state correction value calculation mode", the synchronous machine is controlled to come into the non-energization state.

Next, as the second step of the "magnet state correction value calculation mode", there will be obtained the correction value $\Delta\Phi m$ ($=\Delta\Phi m1$) at a time when as predetermined control commands, the magnetic flux command $\Phi^*$ ($=\Phi 1$) and the δ-axis current command $i\delta^*$ ($=i1$) are given.

In general, the (time constant of the) temperature change in the permanent magnet is smaller than the (time constant of the) temperature change in the armature winding; therefore, preferably, the first step and the second step are continuously implemented in a time when the temperature change in the permanent magnet is small, so that the temperature (magnetic-flux) change in the permanent magnet can almost be neglected. In the second step, the magnetic flux command $\Phi^*$ ($=\Phi 1$) and the δ-axis current command $i\delta^*$ ($=i1$) are given; then, based on a map (equation) that is preliminarily created under the condition of the foregoing magnetic flux command and the δ-axis current command and indicates the relationship between the γ-axis current iγ and the permanent-magnet magnetic flux $\Phi m$, the magnet state estimation device 8 obtains the permanent-magnet magnetic flux estimation value $\Phi m0$ ($=\Phi m1$). In the case where in the first and second steps, the permanent-magnet temperature (magnetic flux) does not change and the forgoing map can accurately be obtained, the output $\Phi 0$ of the armature interlinked magnetic flux estimation device 4 obtained in the first step coincides with the permanent-magnet magnetic flux estimation value $\Phi m0$ obtained in the second step.

However, when the foregoing map (equation) includes an error caused by individual unevenness or an inductance error, an erroneous difference between $\Phi 0$ and ∠m1 occurs; thus, by correcting the erroneous difference between $\Phi 0$ and $\Phi m1$, the magnetic flux can accurately be estimated even when the foregoing map (equation) includes an error. Accordingly, the difference between $\Phi 0$ and $\Phi m1$ is obtained, so that the correction value $\Delta\Phi m$ ($=\Delta\Phi m1$) under the condition of magnetic flux command $\Phi^*$ ($=\Phi 1$) and the δ-axis current command $i\delta^*$ ($=i1$) is obtained and then the value of $\Delta\Phi m1$ is stored. Heretofore, a series of operation of the "magnet state correction value calculation mode" has been described.

Next, the operation of the "magnet state estimation mode" will be explained.

The same condition at a time when in the foregoing "magnet state correction value calculation mode", the correction value $\Delta\Phi m$ ($=\Delta\Phi m1$) has been obtained, i.e., the magnetic flux command $\Phi^*$ ($=\Phi 1$) and the δ-axis current command $i\delta^*$ ($=i1$) are given; then, the magnet state estimation device 8 refers to the γ-axis current iγ, which has flown under the condition of the control commands, in a map (equation) indicating the relationship between the γ-axis current iγ and the permanent-magnet magnetic flux $\Phi m$ and then outputs the permanent-magnet magnetic flux estimation value $\Phi m0$ ($=\Phi m1'$). When the magnet temperature in the "magnet state estimation mode" and the magnet temperature in the "magnet state correction value calculation mode" differ from each other, there occurs a difference between the foregoing $\Phi m1$ and $\Phi m1'$, which corresponds to a magnetic-flux change caused by the magnet temperature.

Figure 9:
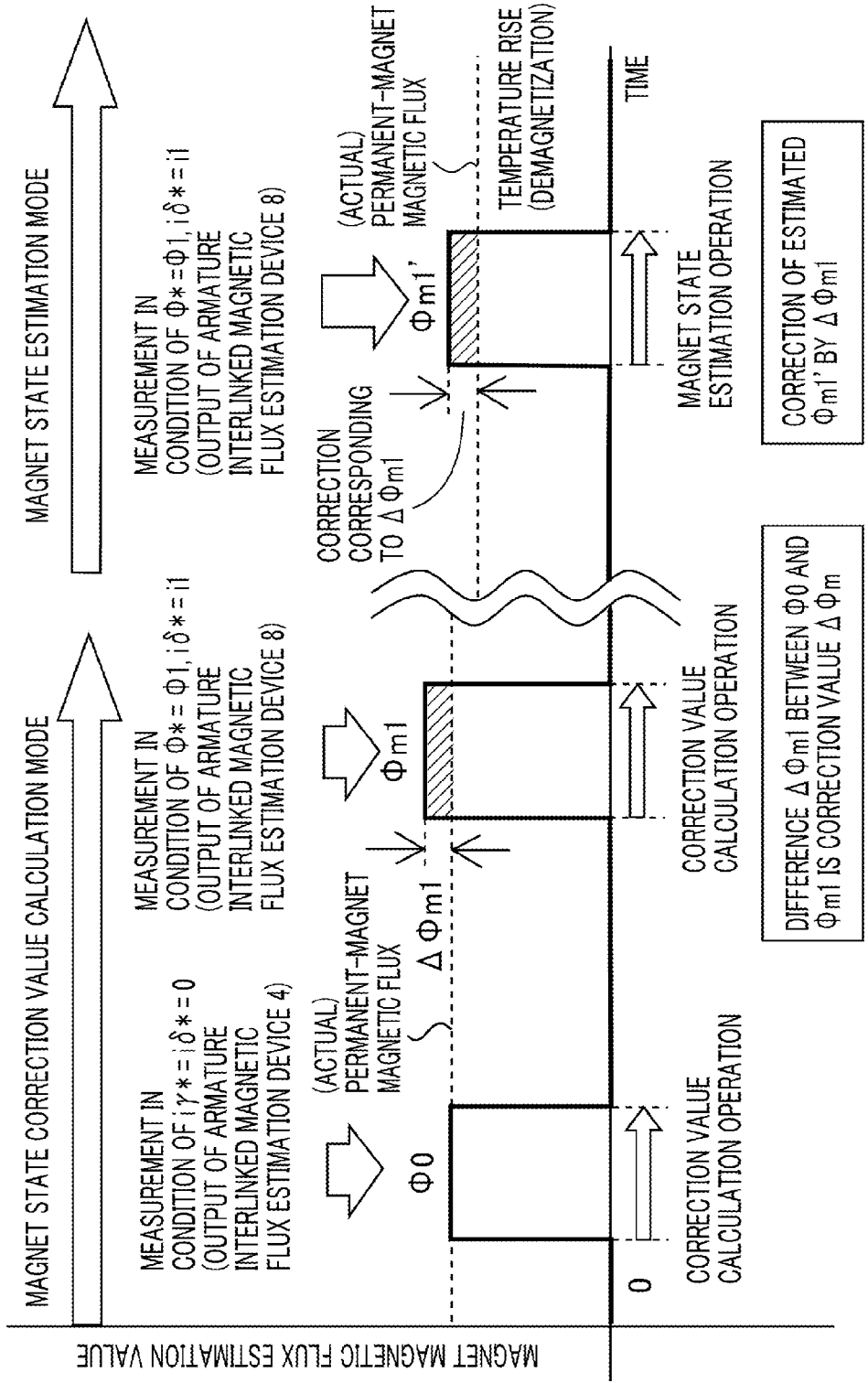
FIG. 9 is a chart representing respective examples of timing charts of a magnet state correction value calculation mode and a magnet state estimation mode in a synchronous machine control device according to Embodiment 1 of the present invention.

As the (corrected) permanent-magnet magnetic flux estimation value $\Phi mag$, the magnet state output means 7 outputs the value ($\Phi m1'+\Delta\Phi m1$) obtained by correcting the outputted permanent-magnet magnetic flux estimation value $\Phi m1'$ by the correction value $\Delta\Phi m1$. FIG. 9 illustrates the respective magnet magnetic flux estimation operations in the "magnet state estimation mode" and the "magnet state correction value calculation mode"; FIG. 9 is a chart representing respective examples of timing charts of the "magnet state correction value calculation mode" and the "magnet state estimation mode" in the synchronous machine control device according to Embodiment 1 of the present invention.

The followings are the summary of the operations of the magnet state estimation device 8 and the magnet state correction means 9 in the "magnet state estimation mode" and the "magnet state correction value calculation mode" in which it is assumed that magnetic flux command $\Phi^*$ ($=\Phi 1$) and the δ-axis current command $i\delta^*$ ($=i1$) are given.

The "magnet state correction value calculation mode"
The magnet state estimation device 8
  The first step: it may not be operated.
  The second step: it outputs $\Phi m0$ ($=\Phi m1$).
The magnet state correction means 9
  The first step: it holds the output $|\Phi|$($=\Phi 0$) of the armature interlinked magnetic flux estimation device 4.
  The second step: it holds the correction value $\Delta\Phi m$ ($=\Delta\Phi m1$) obtained from the difference between $\Phi 0$ and $\Phi m1$.
The "magnet state estimation mode"
  the magnet state estimation device 8: it outputs $\Phi m0$ ($=\Phi m1'$).
  the magnet state correction means 9: it outputs the correction amount $\Delta\Phi m1$ for $\Phi m1'$.

In the case where there is provided the magnet state estimation device 8 including the magnetic condition reference means 81 for each of the plurality of control commands consisting of pairs of the magnetic flux command $\phi^*$ and the δ-axis current command $i\delta^*$, which are represented in FIG.

6, it is only necessary to obtain the correction value δϕm for each of the control commands in the second step of the magnet state correction value calculation mode".

Figure 10:
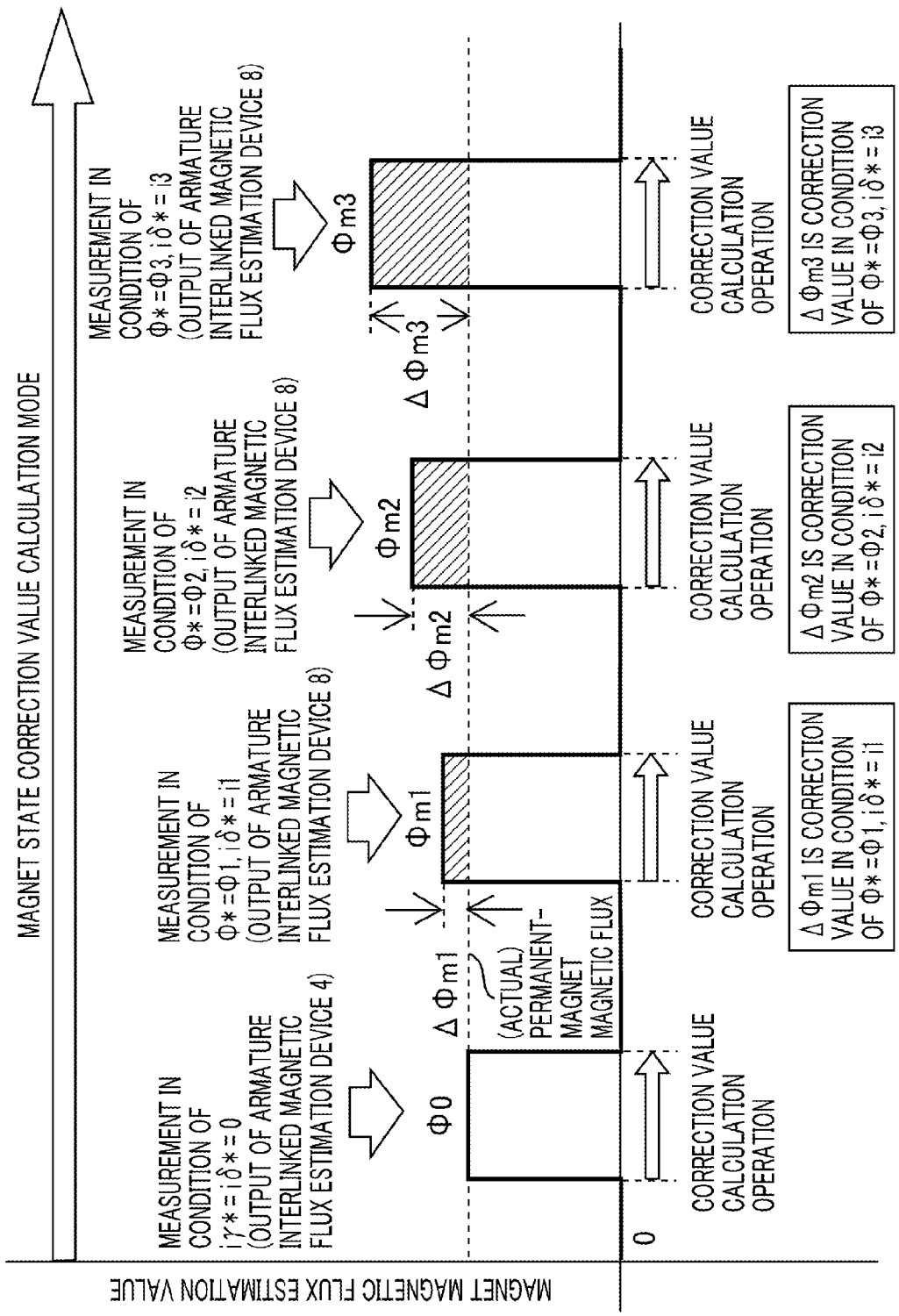
FIG. 10 is a block diagram representing an example of timing chart of the magnet state correction value calculation mode in a synchronous machine control device according to Embodiment 1 of the present invention.

FIG. 10 is a chart representing an example of timing chart of the "magnet state correction value calculation mode" in the synchronous machine control device, according to Embodiment 1 of the present invention, in the case where there is provided the magnet state estimation device 8 including the magnetic condition reference means 81 for each of the plurality of control commands.

In FIG. 10, the first step of the "magnet state correction value calculation mode" is implemented in the same manner as described above; as the second step, at first, the correction value ΔΦm (=ΔΦm1) at a time when as predetermined control commands, the magnetic flux command Φ* (=Φ1) and the δ-axis current command iδ* (=i1) are given is obtained in the same manner as described above. Moreover, the correction value ΔΦm (=ΔΦm2) at a time when the magnetic flux command Φ* (=Φ2) and the δ-axis current command iδ* (=i2), which are different from the foregoing commands, are given is obtained in the same manner as described above; furthermore, the correction value ΔΦm (=ΔΦm3) at a time when the magnetic flux command Φ* (=Φ3) and the δ-axis current command iδ* (=i3), which are different from the foregoing commands, are given is obtained in the same manner as described above. With regard to the respective control commands in the magnetic condition reference means 81, these working items are sequentially implemented in a time period that does not make any rise in the permanent-magnet temperature so as to obtain and store the correction value ΔΦm for each of the foregoing control commands.

The error caused by the individual unevenness or the inductance error hardly depends on the rotation speed of the synchronous machine 1; thus, in order to prevent the permanent-magnet temperature from rising, it is suitable that when the rotation speed of the synchronous machine 1 is low, the correction values ΔΦm are sequentially obtained so that the iron loss in the synchronous machine 1 is decreased and heat generation caused by the iron loss is suppressed.

In the "magnet state estimation mode", a pair of the control commands (Φ* and iδ*) is selected from the plurality of control command conditions in the magnetic condition reference means 81; the permanent-magnet magnetic flux estimation value Φm0 is obtained in the same manner as described above; the correction value ΔΦm, for the foregoing control command condition, that has been preliminarily stored through the above-mentioned method is obtained; then, by correcting Φm0 by ΔΦm, the corrected permanent-magnet magnetic flux estimation value Φmag is obtained.

Heretofore, there has been described an example in which predetermined control commands (Φ* and iδ*) are given so as to estimate the permanent-magnet magnetic flux Φm; however, in the case where when the permanent-magnet magnetic flux Φm is estimated, it is not required that the synchronous machine 1 generates torque, it may be allowed that by controlling the δ-axis current to be "0", i.e., by giving "0" as the δ-axis current command iδ*, the permanent-magnet magnetic flux estimation operation is implemented under the unloaded condition.

As described above, the torque of the synchronous machine 1 is proportional to the product of the armature interlinked magnetic flux Φ and the δ-axis current iδ; therefore, when the δ-axis current iδ is zero, the torque becomes zero regardless of the magnetic flux command Φ*.

Furthermore, when it is made that only the γ-axis current iγ flows so that the δ-axis current iδ becomes zero, all the vectors of the permanent-magnet magnetic flux Φm, the armature reaction magnetic flux Φa produced by the γ-axis current iγ, and the total armature-interlinked magnetic flux Φ lie on a single and the same axis, and the γ axis becomes equal to the d axis, and the δ axis becomes equal to the q axis. That is to say, the equation "Φa=Lγ·iγ=Ld·id" is established; thus, there is demonstrated an advantage that even when there exists an error in the q-axis inductance Lq, the error does not provide any effect.

In the low speed zone in which it is not required to make a weakening magnetic flux current flow in the armature winding, for example, as the magnetic flux command Φ*, there is set the value of permanent-magnet magnetic flux at a time when due to heat generation, demagnetization is caused (e.g., at 100° C.) and a map (equation) indicating the relationship between the γ-axis current iγ and the permanent-magnet magnetic flux Φm at a time of the magnetic flux command Φ* (iδ*=0) is preliminarily prepared, so that at a temperature around 100° C., the magnetic flux command Φ* and the permanent-magnet magnetic flux Φm almost coincide with each other and hence the armature reaction magnetic flux Φa is hardly generated; therefore, the γ-axis current iγ hardly flows and hence the effect of the foregoing inductance error can be reduced.

In the high speed zone in which it is required to make the weakening magnetic flux current flow in the armature winding, for example, as the magnetic flux command Φ*, a value that is small enough for the permanent-magnet magnetic flux Φm is set so that the (unloaded) induction voltage generated in the armature of the synchronous machine 1 becomes the same as or lower than the outputtable voltage of the electric-power conversion means 2 and a map (equation) indicating the relationship between the γ-axis current iγ and the permanent-magnet magnetic flux Φm at a time of the magnetic flux command Φ* (iδ*=0) is preliminarily prepared, so that even when a weakening magnetic flux current, which makes the foregoing inductance error provide an effect, is made to flow in the armature, the combination of the "magnet state correction value calculation mode" and the "magnet state estimation mode" can reduce the effect of the inductance error.

Figure 11:
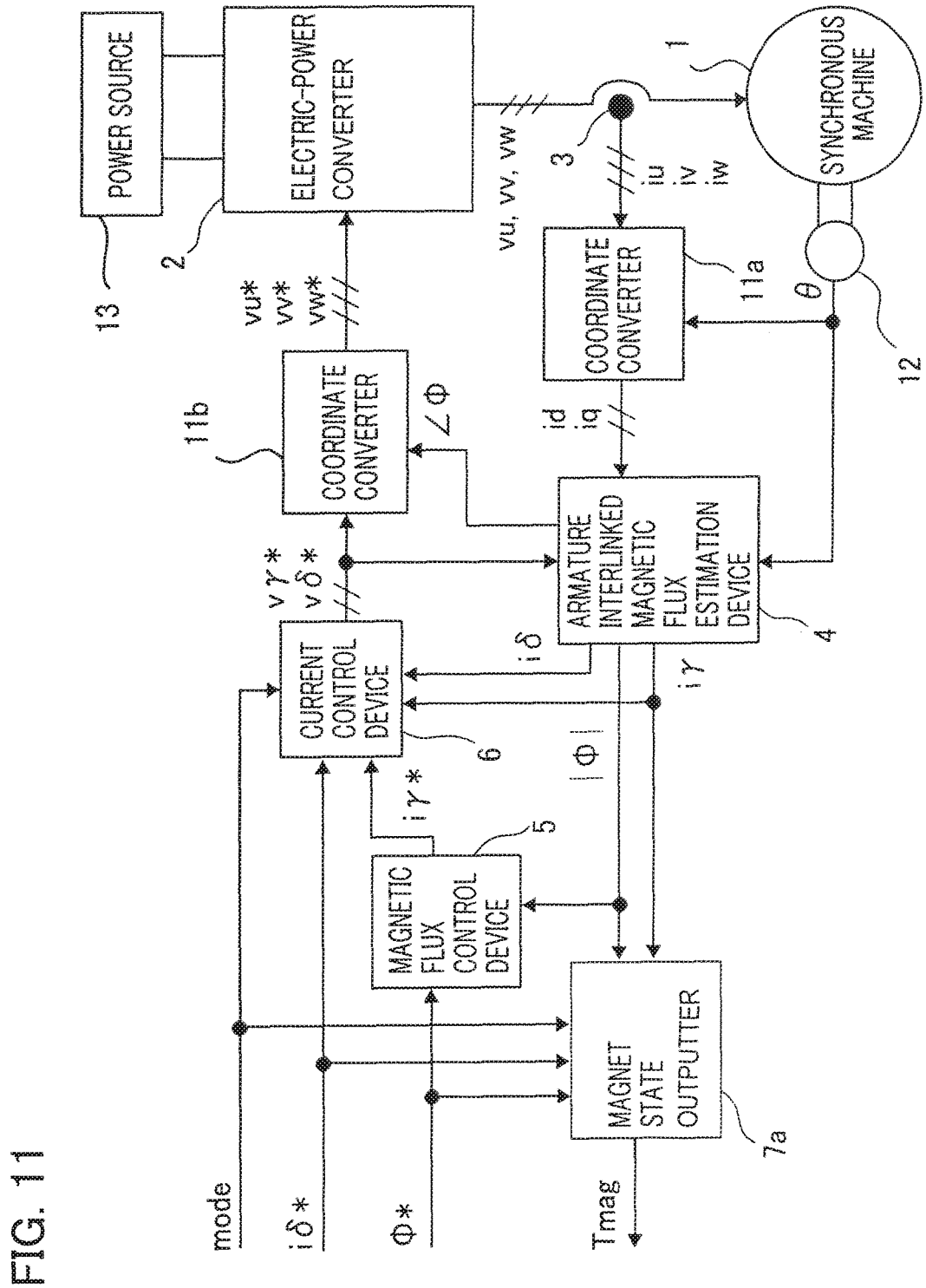
FIG. 11 is a system configuration diagram illustrating a variant example of synchronous machine control device, which is different from the one in FIG. 3, according to Embodiment 1 of the present invention, along with a synchronous machine.

In the configuration in FIG. 1, the output of the magnet condition estimation means 7 is the (corrected) permanent-magnet magnetic flux estimation value Φmag; however, the permanent-magnet temperature and the permanent-magnet magnetic flus are correlated with each other; thus, comprehension of the correlation between them makes it possible to utilize a permanent-magnet temperature evaluation value Tmag as the output of the magnet state output means 7. FIG. 11 is a system configuration diagram illustrating, along with a synchronous machine 1, a synchronous machine control device, according to Embodiment 1 of the present invention, that is different from the synchronous machine control device illustrated in FIG. 1; the output of the magnet state output means 7 (7a in FIG. 11) has changed from the permanent-magnet magnetic flux estimation value Φmag to the permanent-magnet temperature estimation value Tmag. For example, in the case of a permanent magnet in which 1% of demagnetization is caused as the temperature rises by 10° C., the relationship between the permanent-magnet temperature (estimation value) Tmag and the permanent-magnet magnetic flux (estimation value) Φmag is given by the equation (10) below, letting Tb and ΦmTb denote a reference temperature and the (reference) permanent-magnet magnetic flux at a time when the temperature is Tb, respectively.

$$\Phi mag = \Phi mTb \cdot \{1 - (Tmag - Tb) \cdot 0.001\} \quad (10)$$

By utilizing the relationship in the equation (10), it is made possible to utilize the permanent-magnet temperature estimation value Tmag as the output of the magnet state output means 7. Moreover, although not illustrated, it goes without saying that when in the magnet state output means in FIG. 4, the output of the magnet state estimation device 8 is changed from the (uncorrected) permanent-magnet magnetic flux estimation value Φm0 to the (uncorrected) permanent-magnet temperature estimation value Tm0, the correction amount to be obtained by the magnet state correction means 9 can be changed from the magnetic flux correction amount ΔΦm to the temperature correction amount ΔTm. Furthermore, although not particularly illustrated, instead of the position detection means 12 in FIG. 11, the position detection means 12a in FIG. 3 can be utilized, as is the case with FIG. 1.

As described above, the synchronous machine control device according to Embodiment 1 of the present invention makes it possible to correct an estimation error, in the magnetic flux or the temperature of the permanent magnet, that is caused by the individual unevenness or the inductance error of the synchronous machine 1; therefore, there is demonstrated an advantage that the estimation accuracy for the magnetic flux or the temperature of the permanent magnet can be raised. Moreover, the armature interlinked magnetic flux and the δ-axis current that are directly related to the torque generated by the synchronous machine 1 can directly be controlled; therefore, there is demonstrated an advantage that even when demagnetization of the permanent magnet occurs while the magnetic flux or the temperature of the permanent magnet is estimated, the torque can be controlled to desired torque.

Furthermore, the permanent-magnet magnetic flux (temperature) is outputted, based on the γ-axis current, for each of a plurality of control commands consisting of pairs of the magnetic flux command and the δ-axis current command and then the magnet state correction value is calculated for each of the plurality of pairs of the magnetic flux command and the δ-axis current command, so that the degree of flexibility in giving the pair of the magnetic flux command and the δ-axis current command is raised, i.e., the degree of flexibility of the output torque at a time when the estimation operation is implemented is raised.

Embodiment 2

Figure 12:
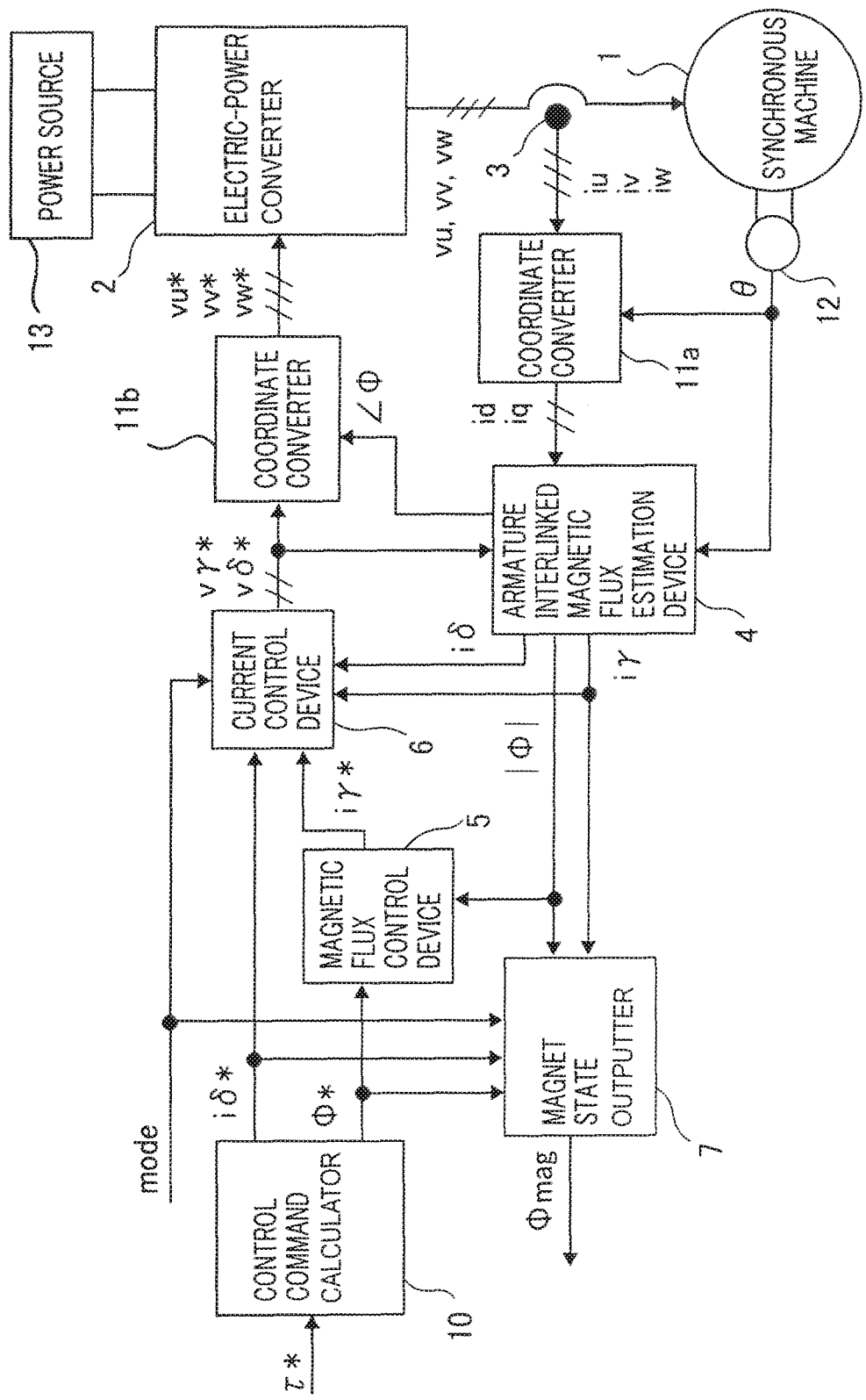
FIG. 12 is a system configuration diagram illustrating a synchronous machine control device according to Embodiment 2 of the present invention, along with a synchronous machine.

Next, a synchronous machine control device according to Embodiment 2 of the present invention will be explained. FIG. 12 is a system configuration diagram illustrating a synchronous machine control device according to Embodiment 2 of the present invention, along with a synchronous machine 1. As illustrated in FIG. 12, in the synchronous machine control device according to Embodiment 2 of the present invention, a control command calculation means 10 (e.g., control command calculator), which is a higher-hierarchy command creation system for creating control commands (Φ*, iδ*) based on the torque command τ*, is added to the synchronous machine control device according to Embodiment 1 of the present invention. Although not particularly illustrated, instead of the position detection means 12 in FIG. 12, the position detection means 12a in FIG. 3 may be utilized, as is the case with FIG. 1; in addition, as is the case with FIG. 11, it may be allowed that the foregoing correlation between the permanent-magnet temperature and the permanent-magnet magnetic flux is utilized and the permanent-magnet temperature estimation value Tmag is utilized as the output of the magnet state output means 7.

Figure 13:
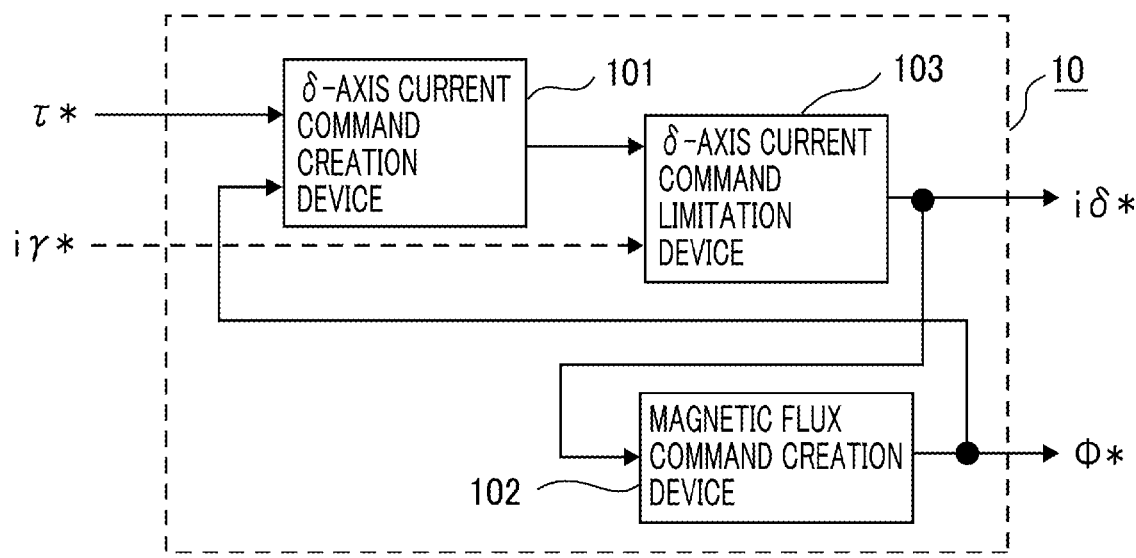
FIG. 13 is a block diagram representing an example of configuration of a control command calculation means in a synchronous machine control device according to Embodiment 2 of the present invention.

FIG. 13 is a configuration diagram illustrating an example of configuration of the control command calculation means 10 in FIG. 12.

In FIG. 13, the control command calculation means 10 is configured with a δ-axis current command creation device 101 and a magnetic flux command creation device 102; in order to further optimize the control command calculation means 10, a δ-axis current command limitation device 103, which utilizes the γ-axis current command iγ* (indicated by a dotted-line arrow in FIG. 13) calculated by the magnetic flux control device 5 so as to limit the δ-axis current command iδ*, is added. Based on the torque command τ*, the control command creation device 10 creates the magnetic flux command Φ* and the δ-axis current command iδ*. In the case of the synchronous machine 1 having a magnetic-field permanent magnet, it is known that there exist countless pairs of the magnetic flux command Φ* and the δ-axis current command iδ*, which can generate the same torque; in response to the torque command τ*, the control command creation device 10 outputs the appropriate magnetic flux command Φ* and δ-axis current command iδ* that coincide with a desired condition (e.g., the maximum efficiency, the maximum torque, or the like). Based on the torque command τ* and the magnetic flux command Φ* outputted from the magnetic flux command creation device 102, the δ-axis current command creation device 101 calculates the δ-axis current command Iδ*, through the equation (11) below.

$$i\delta^* = \frac{\tau^*}{Pm \cdot \Phi^*} \quad (11)$$

where Pm is the number of pole pairs in the synchronous machine 1. The magnetic flux control device 5 in FIG. 12 performs the control in such a way that the magnetic-flux difference ΔΦ becomes zero; therefore, in the calculation based on the equation (11), the magnitude |Φ| of the armature interlinked magnetic flux Φ estimated by the armature interlinked magnetic flux estimation device 4 may be utilized instead of the magnetic flux command Φ*. In the case where the δ-axis current command limitation device 103 is added, the δ-axis current command iδ* is limited, based on a current limitation value imax and the γ-axis current command iγ*, in such a way that the synthetic electric current (command) of the δ-axis current command iδ* and the γ-axis current command iγ* is limited to be the same as or smaller than the current limitation value imax that is determined based on the specification of the electric-power conversion means 2 or the like. The upper limit value iδ*max of the δ-axis current command iδ* is obtained from the equation (12) below; while iδ*max is sequentially obtained, the δ-axis current command iδ* is limited in such a way that the absolute value |iδ*| of the δ-axis current command iδ* becomes the same as or smaller than iδ*max.

$$i\delta^* max = \sqrt{(imax)^2 - (i\gamma^*)^2} \quad (12)$$

In response to the inputted δ-axis current command iδ*, the magnetic flux command creation device 102 outputs a suitable magnetic flux command Φ*, for example, the magnetic flux command Φ* with which the maximum torque is outputted under the condition that the armature current (effective value) of the synchronous machine 1 is constant. When under the foregoing condition, the synchronous machine 1 is driven, the copper loss caused in the lead wire between the armature winding of the synchronous machine 1 and the electric-power conversion means 2 becomes smaller, and the conduction loss caused in the electric-power conversion means 2 also becomes smaller; therefore, the conversion efficiencies of the synchronous machine 1 and the electric-power conversion means 2 are raised.

Figure 14:
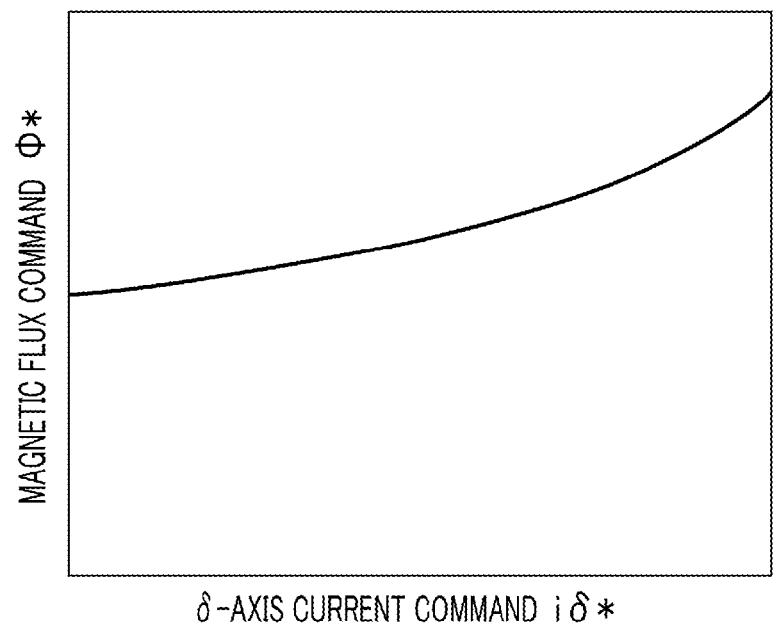
FIG. 14 is a conceptual chart for representing an example of the relationship between the δ-axis current command iδ* and the magnetic flux command Φ* in the magnetic flux command creation device in FIG. 13.

FIG. 14 is a conceptual chart representing an example of relationship between the δ-axis current command iδ* and the magnetic flux command Φ*, which satisfies the foregoing condition with which the maximum torque is outputted; the relationship is preliminarily stored, as an equation or table data, in the magnetic flux command creation device 102, and then a suitable magnetic flux command Φ* is outputted in response to the inputted δ-axis current command iδ*. As another suitable +magnetic flux command Φ*, although not illustrated, there exists a magnetic flux command Φ* for which in addition to the δ-axis current command iδ*, the rotation speed ω of the synchronous machine 1 is referred to, and with which the iron loss, including the eddy current loss and the hysteresis loss in the synchronous machine 1, that depends on the speed can be reduced for the δ-axis current command iδ*. When the synchronous machine 1 is driven under these conditions, there is reduced the iron loss, caused in the synchronous machine 1, that becomes conspicuous when the rotation speed thereof is high; thus, mainly in the zone of high rotation speed, the conversion efficiency of the synchronous machine 1 is raised.

In the case where in the control command calculation means 10 illustrated in FIG. 13, the δ-axis current command limitation device 103 is added and the δ-axis current command iδ* is limited through the equation (12), the calculation performed from the δ-axis current command creation device 101 to the magnetic flux command creation device 102 becomes circular. That is to say, there is established a loop "the torque command τ*→(the δ-axis current command creation device 101, the δ-axis current command limitation device 103)→the δ-axis current command iδ*→(the magnetic flux command creation device 102)→the magnetic flux command Φ*→(the δ-axis current command creation device 101)→the δ-axis current command iδ*" . . . ; thus, in order to determine the δ-axis current command iδ* and the magnetic flux command Φ* for the inputted torque command τ*, it is required to recurrently carry out and converge the calculation performed from the δ-axis current command creation device 101 to the magnetic flux command creation device 102; therefore, it becomes difficult to perform the calculation processing. Accordingly, when in an actual device, the foregoing processing is performed by a microcomputer with a predetermined calculation cycle, it may be required to take measures such as raising the stability of the calculation processing, for example, in such a way that as the magnetic flux command Φ* to be utilized by the δ-axis current command creation device 101, the immediately previous (one calculation cycle before) calculation result is utilized, and the present magnetic flux command Φ* is calculated based on the δ-axis current command iδ* calculated by use of the command value, or in such a way that the magnetic flux command creation device 102 outputs the value of the magnetic flux command Φ* through an appropriate filter.

Figure 15:
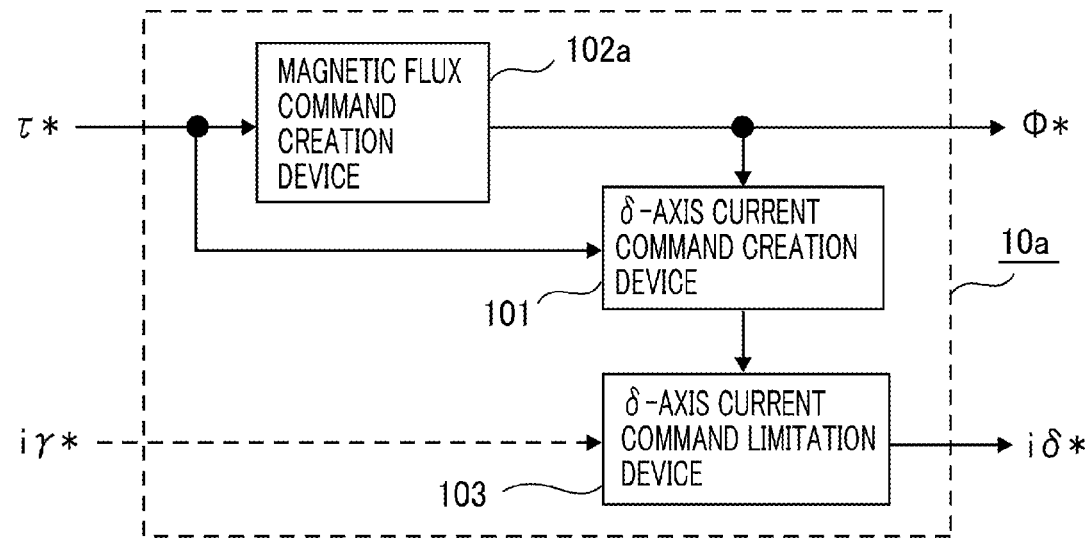
FIG. 15 is a block diagram illustrating another configuration example of control command calculation means in FIG. 13.

In FIG. 12, instead of the control command calculation means 10 illustrated in FIG. 13, a control command calculation means 10*a*, described later, may be utilized. FIG. 15 is a configuration diagram illustrating another configuration example of the control command calculation means in FIG. 13. In FIG. 15, the control command calculation means 10*a* creates the magnetic flux command Φ* based on not the δ-axis current command iδ* but the torque command τ*. A magnetic flux command creation device 102*a* in FIG. 15 outputs a suitable magnetic flux command Φ* in response to the inputted torque command τ*. For example, by converting the abscissa of the chart in FIG. 14 into the torque command τ* by use of the relationship in the equation (13) below, the magnetic flux command Φ* for the inputted torque command τ* can be obtained.

$$\tau^* = Pm \cdot \Phi^* \cdot i\delta^* \quad (13)$$

Figure 16:
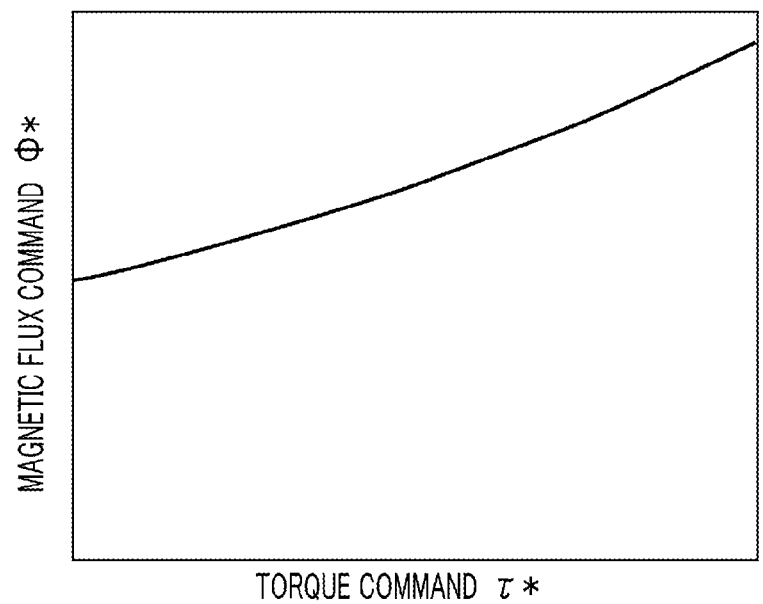
FIG. 16 is a conceptual chart for representing an example of the relationship between the torque command τ* and the magnetic flux command Φ* in the magnetic flux command creation device in FIG. 15.

FIG. 16 is a conceptual chart for explaining the relationship between the torque command τ* and the magnetic flux command Φ*, derived by the equation (13) based on the relationship represented in FIG. 14; the magnetic flux command creation device 102*a* preliminarily stores the relationship, as an equation or table data, and then outputs a suitable magnetic flux command Φ* in accordance with the inputted torque command τ*. The operations of the δ-axis current command creation device 101 and the δ-axis current command limitation device 103 in the control command calculation means 10*a* are the same as those in the control command calculation means 10. Furthermore, in order to optimize the control command calculation means 10 and 10*a*, it is only necessary to create the magnetic flux command Φ*, for which the voltage limitation value, which is limited by the specification of the electric-power conversion means 2, is taken into consideration.

In the electric-power conversion means 2, there exists an output-capable voltage maximum value Vmax (converted into an effective value) that depends on the specification of the electric-power conversion means 2 and the output voltage Vpn of the power source 13; it is desirable that the magnetic flux command Φ* is limited in such a way that the induction voltage generated in the armature of the synchronous machine 1 is suppressed to be the same as or lower than Vmax. The induction voltage is determined by the multiplication product of the rotation speed ω of the synchronous machine 1 and the armature interlinked magnetic flux Φ, when the voltage drop across the resistance R of the synchronous machine 1 is neglected; thus, it is more suitable that based on the outputtable maximum voltage value Vmax of the electric-power conversion means 2, the magnetic-flux maximum value Φmax corresponding to the rotation speed ω of the synchronous machine 1 is sequentially calculated through the equation (14) below and the value obtained by limiting the output of the magnetic flux command creation device 102 (102*a*) by Φmax is adopted as the magnetic flux command Φ*.

$$\Phi\max = \frac{V\max - R \cdot i\delta^* - \Delta V}{\omega} \cong \frac{V\max - \Delta V}{\omega} \quad (14)$$

$$V\max = \frac{Vpn}{\sqrt{2}}$$

where ΔV is a predetermined margin.

As described above, the synchronous machine control device according to Embodiment 2 of the present invention demonstrates an advantage that the torque can accurately be controlled by performing the control based on the torque command. Moreover, there is demonstrated an advantage that the armature current, of the synchronous machine 1, that is limited by the performance of the electric-power conversion means 2 can be suppressed to be the same as or smaller than the limitation value.

Embodiment 3

Figure 17:
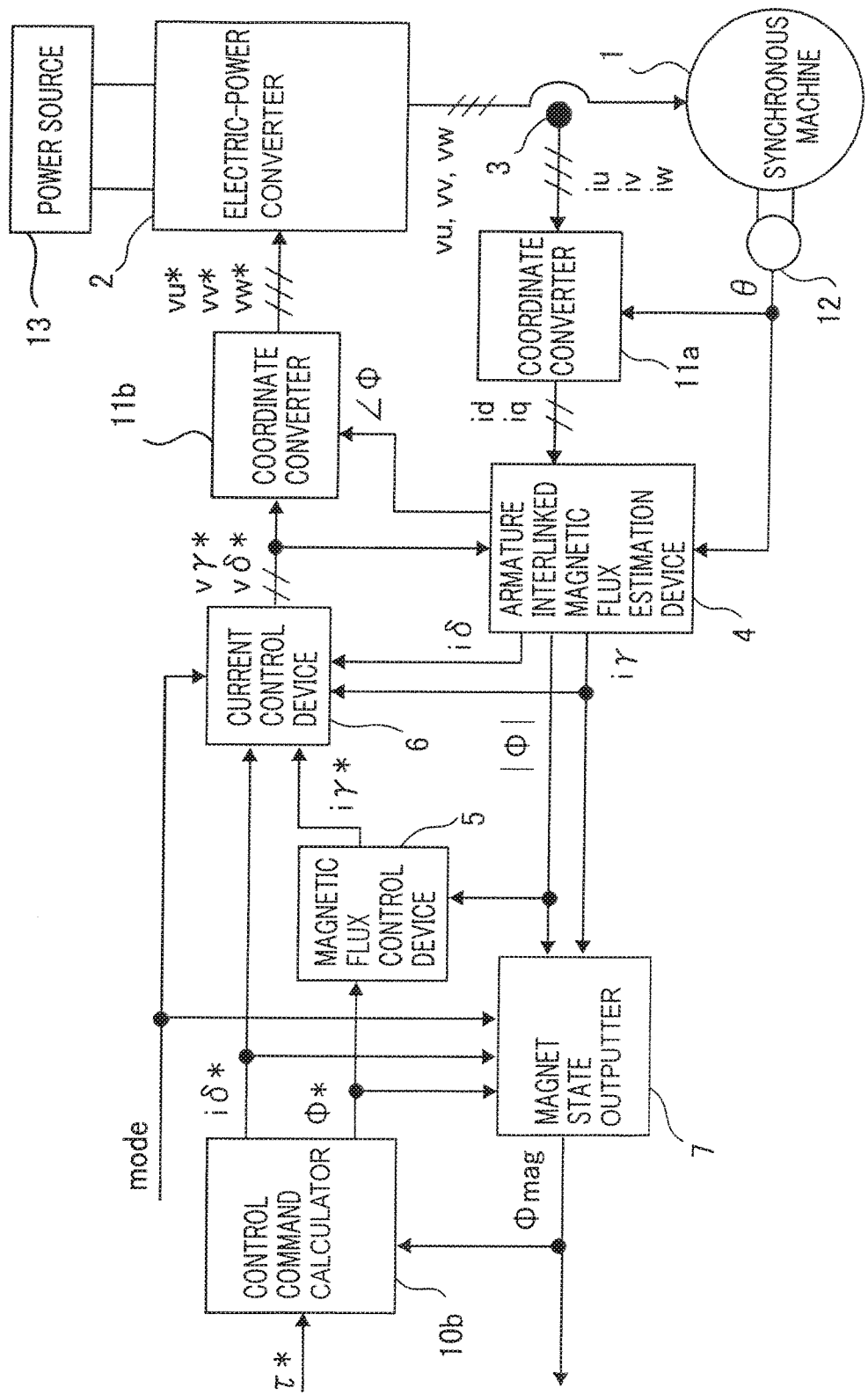
FIG. 17 is a system configuration diagram illustrating a synchronous machine control device according to Embodiment 3 of the present invention, along with a synchronous machine.

Next, a synchronous machine control device according to Embodiment 3 of the present invention will be explained. FIG. 17 is a system configuration diagram illustrating a synchronous machine control device according to Embodiment 3 of the present invention, along with a synchronous machine 1. As illustrated in FIG. 17 or after-mentioned FIG. 18, in contrast to the synchronous machine control device according to Embodiment 2, the synchronous machine control device according to Embodiment 3 of the present invention is configured in such away that a control command calculation means 10b limits the torque command $\tau^*$ for the synchronous machine 1 in accordance with the permanent-magnet magnetic flux $\Phi$mag or the temperature Tmag and creates the control commands ($\Phi^*$, $i\delta^*$) based on the limited torque command $\tau 0^*$. Although not particularly illustrated, instead of the position detection means 12 in FIG. 17, the position detection means 12a in FIG. 3 may be utilized, as is the case with FIG. 1; in addition, as is the case with FIG. 11, it may be allowed that the foregoing correlation between the permanent-magnet temperature and the permanent-magnet magnetic flux is utilized and the permanent-magnet temperature estimation value Tmag is utilized as the output of the magnet state output means 7.

Figure 18:
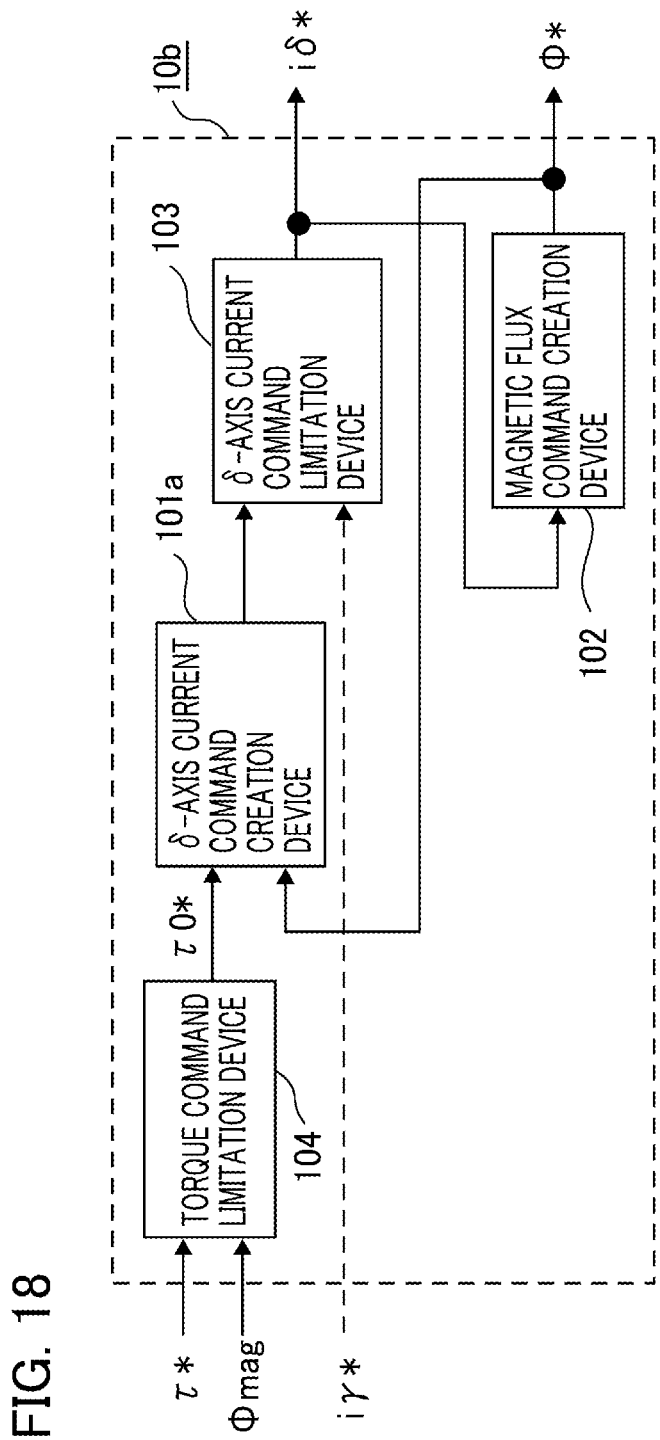
FIG. 18 is a block diagram representing an example of configuration of a control command calculation means in a synchronous machine control device according to Embodiment 3 of the present invention.

FIG. 18 is a configuration diagram illustrating an example of configuration of the control command calculation means 10a in FIG. 17. In the control command calculation means 10b in FIG. 18, in addition to the configuration consisting of the $\delta$-axis current command creation device 101, the magnetic flux command creation device 102, and the $\delta$-axis current command limitation device 103, there is provided a torque command limitation device 104 that limits the torque command $\tau^*$ in accordance with the permanent-magnet magnetic flux $\Phi$mag or the temperature Tmag to be outputted from the magnet state output means 7 and outputs the (limited) torque command $\tau 0^*$. FIG. 18 illustrates a configuration in which the torque command limitation device 104 is added to the control command calculation means 10 in FIG. 13; however, it goes without saying that the torque command limitation device 104 may be added to the control command calculation means 10a illustrated in FIG. 15.

As described above, in the case where a synchronous machine 1 having a permanent magnet as a magnet-field magnet is controlled by a synchronous machine control device having the electric-power conversion means 2, a temperature rise due to energization of the armature of the synchronous machine or the like causes a so-called "demagnetization" phenomenon in which the intensity of magnetization of the magnetic-field permanent magnet, i.e., the magnetic flux is reduced; furthermore, when the allowable temperature is exceeded, a so-called "irreversible demagnetization" phenomenon is caused in which even when the temperature falls down to the normal temperature, the magnetic flux does not return to the state at a time before the demagnetization is caused. Accordingly, the control needs to be performed at least in such a way that the temperature of the permanent magnet is suppressed to be the same as or lower the allowable temperature at which the irreversible demagnetization occurs. In particular, when the torque generated by the synchronous machine 1 becomes large, the temperature of the permanent magnet is liable to rise.

As described above, the $\gamma$-axis current $i\gamma$ corresponds to the magnetization current for operating the armature interlinked magnetic flux $\Phi$ of the synchronous machine 1; when due to a temperature rise, demagnetization (decrease in the magnetic flux, corresponding to $\Delta\Phi$mag) of the permanent magnet is caused, an increase in the $\gamma$-axis current $i\gamma$ compensates the magnetic flux corresponding to the demagnetization when the control command is constant. Accordingly, as the $\gamma$-axis current $i\gamma$ increases, the armature current (effective value) of the synchronous machine 1 also increases; thus, due to the heat (such as the heat produced in the resistance of the armature winding) produced in the synchronous machine 1, the temperature of the overall synchronous machine 1 including the permanent magnet also increases; thus, demagnetization of the permanent magnet is facilitated.

Accordingly, in the case where the temperature of the synchronous machine 1 rises, in order to suppress the temperature from rising further and the armature current of the synchronous machine 1 from excessing the upper limit, the temperature rise of the permanent magnet is determined based on the permanent-magnet magnetic flux $\Phi$mag outputted from the magnet state output means 7 or the temperature Tmag and the torque command $\tau^*$ is limited in accordance with $\Phi$mag (or Tmag), so that the magnitudes (absolute values) of the control commands ($\Phi^*$, $i\delta^*$) are indirectly decreases and hence the armature current (effective value) is suppressed from increasing.

The torque command limitation device 104 limits the torque command $\tau^*$ in accordance with the foregoing $\Phi$mag (or Tmag) and outputs the (limited) torque command $\tau 0^*$. The correlation between the foregoing $\Phi$mag (or Tmag) and the torque command $\tau^*$ is set in accordance with the driving condition, the heat capacity of the synchronous machine 1 or cooling performance thereof, and the performance of the electric-power conversion means 2. For example, when with predetermined control commands ($\Phi^*$, $i\delta^*$), the foregoing $\Phi$mag becomes the same as or smaller than a given value or the foregoing Tmag exceeds a predetermined value, it is determined that the permanent-magnet temperature has approximated to a temperature leading to irreversible demagnetization, and then, the torque command $\tau^*$ is limited so as to decrease; extremely speaking, for example, processing of decreasing the torque command to "0" is implemented and the (limited) torque command $\tau 0^*$ is outputted.

Except for adding the torque command limitation device 104, the control command calculation means 10b is the same as the control command calculation means 10 (or 10a) in the synchronous machine control device according to Embodiment 2 of the present invention; however, because at the input of the $\delta$-axis current command creation device 101a in FIG. 18, the torque command $\tau^*$ is replaced by the (limited) torque command $\tau 0^*$, the calculation through the equation (11) is performed by use of $\tau 0^*$ instead of $\tau^*$.

As described above, the synchronous machine control device according to Embodiment 3 of the present invention limits the torque command when the temperature of the permanent magnet rises and hence limits the increase in the armature current (effective value) so as to suppress the temperature from further rising; thus, there is demonstrated an advantage that irreversible demagnetization can be prevented.

INDUSTRIAL APPLICABILITY

The present invention is a synchronous machine control device that controls a synchronous machine having a magnetic-field permanent magnet by use of an electric-power conversion means such as an inverter; the synchronous machine control device can accurately estimate the temperature or the magnetic flux value of a permanent magnet, without mounting any temperature detection device on the permanent magnet.

DESCRIPTION OF REFERENCE NUMERALS

1: synchronous machine
2: electric-power conversion means
3: current detection means
4, 4a: armature interlinked magnetic flux estimation device
5: magnetic flux control device
6: current control device
7, 7a: magnet state output means
8: magnet state estimation device
9: magnet state correction means
10, 10a, 10b: control command calculation means
11a, 11b: coordinate transformer
12, 12a: position detection means
13: power source
21a through 21c: adder-subtractor
22a, 22b: switch
23a, 23b: PI controller
81a, 81b, 81c: magnetic condition reference means 81
101, 101a: δ-axis current command creation device
102, 102a: magnetic flux command creation device
103: δ-axis current command limitation device
104: torque command limitation device

The invention claimed is:

1. A synchronous machine control device comprising:
an electric-power converter that outputs a voltage to a synchronous machine having a permanent magnet for forming a magnetic field, based on a voltage command;
a current detector that detects an armature current of the synchronous machine;
an armature interlinked magnetic flux estimation device that estimates, based on the voltage command, a magnitude of an armature interlinked magnetic flux of the synchronous machine and a γ axis along which the armature interlinked magnetic flux is generated and that coordinate-transforms the armature current into a current on a γ-δ axis consisting of the γ axis and a δ axis that is perpendicular to the γ axis, based on a rotor position of the synchronous machine and the estimated γ axis;
a magnetic flux control device that generates a γ-axis current command for controlling a γ-axis current to be a predetermined value, based on a magnetic flux command and the magnitude of the armature interlinked magnetic flux;
a current control device that generates the voltage command, based on a γ-δ axis current command obtained by adding a δ-axis current command to the γ-axis current command and the γ-δ axis current; and
a magnet state outputter that estimates and outputs a magnetic flux or a temperature of the permanent magnet,
wherein the magnet state outputter is provided with a magnet state estimation device for estimating the magnetic flux or the temperature of the permanent magnet based on the γ-axis current, the δ-axis current command, and the magnetic flux command, and is further provided with a magnet state corrector, and the magnet state outputter operates in one of a magnet state correction value calculation mode and a magnet state estimation mode,
wherein in the magnet state correction value calculation mode, the magnet state outputter transmits, to the magnet state estimation device, zero as each of current commands of the respective axes on the γ-δ axis and calculates a magnet state correction value, based on the magnitude of the armature interlinked magnetic flux estimated under a condition of the current commands and a magnetic flux estimation value or a temperature estimation value of the permanent magnet obtained by the magnet state estimation device under a condition that a predetermined magnetic flux command and the δ-axis current command are given to the magnet state estimation device, and
wherein in the magnet state estimation mode, the magnet state outputter controls the magnet state corrector to correct by the magnet state correction value the magnetic flux estimation value or the temperature estimation value of the permanent magnet obtained by the magnet state estimation device under the condition that the predetermined magnetic flux command and the δ-axis current command are given.

2. The synchronous machine control device according to claim 1,
wherein in the magnet state correction value calculation mode, the magnet state outputter calculates the magnet state correction value for each of a plurality of predetermined pairs of the magnetic flux command and the δ-axis current command, based on the magnetic flux estimation value or the temperature estimation value of the permanent magnet obtained by the magnet state estimation device, and
wherein in the magnet state estimation mode, the magnet state outputter controls the magnet state corrector to select a pair of commands in the plurality of predetermined pairs of the magnetic flux command and the δ-axis current command and then correct the magnetic flux estimation value or the temperature estimation value of the permanent magnet obtained by the magnet state estimation device under a condition that the pair of commands are given to the magnet state estimation device, by the magnet state correction value that makes a pair with the selected pair of the magnetic flux command and the δ-axis current command.

3. The synchronous machine control device according to claim 2, further including a control command calculator that generates the magnetic flux command and the δ-axis current command, based on a torque command for the synchronous machine.

4. The synchronous machine control device according to claim 3, wherein the control command calculator limits the torque command for the synchronous machine in accordance with the magnetic flux estimation value or the temperature estimation value of the permanent magnet outputted by the magnet state outputter and outputs the magnetic flux command and the δ-axis current command in response to the limited torque command.

5. The synchronous machine control device according to claim 1, further including a control command calculator that generates the magnetic flux command and the δ-axis current command, based on a torque command for the synchronous machine.

6. The synchronous machine control device according to claim 5, wherein the control command calculator limits the torque command for the synchronous machine in accordance with the magnetic flux estimation value or the temperature estimation value of the permanent magnet outputted by the magnet state outputter and outputs the magnetic flux command and the δ-axis current command in response to the limited torque command.

* * * * *